(12) United States Patent
Harpel et al.

(10) Patent No.: US 8,538,124 B1
(45) Date of Patent: Sep. 17, 2013

(54) SYSTEMS AND METHODS FOR REAL-TIME VALIDATION OF CHECK IMAGE QUALITY

(75) Inventors: Greg Alan Harpel, San Antonio, TX (US); R. Bharat Prasad Nuggehalli, San Antonio, TX (US); Michael Frank Morris, San Antonio, TX (US)

(73) Assignee: United Services Auto Association (USAA), San Antonio, TX (US)

( * ) Notice: Subject to any disclaimer, the term of this patent is extended or adjusted under 35 U.S.C. 154(b) by 1324 days.

(21) Appl. No.: 11/747,223

(22) Filed: May 10, 2007

(51) Int. Cl.
*G06K 9/00* (2006.01)
(52) U.S. Cl.
USPC ............................ 382/137; 382/131; 382/139
(58) Field of Classification Search
USPC .......... 382/131, 137, 139, 130, 173; 705/40, 705/44
See application file for complete search history.

(56) References Cited

U.S. PATENT DOCUMENTS

| | | |
|---|---|---|
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Grosbard |
| 4,636,099 A | 1/1987 | Goldston |
| 4,640,413 A | 2/1987 | Kaplan |
| 4,644,144 A | 2/1987 | Chandek |
| 4,722,444 A | 2/1988 | Murphy |
| 4,722,544 A | 2/1988 | Weber |
| 4,727,435 A | 2/1988 | Donovon |

(Continued)

FOREIGN PATENT DOCUMENTS

EP 0 984 410 3/2000

OTHER PUBLICATIONS

Federal Check 21 Act, "New Check 21 Act Effective Oct. 28, 2004: Banks No Longer Will Return Original Cancelled Checks," Consumer Union's FAQ's and Congressional Testimony on Check 21, www.consumerlaw.org/initiatives/content/check21_content.html, downloaded Dec. 2005, 20 pages.

(Continued)

*Primary Examiner* — Wesley Tucker
(74) *Attorney, Agent, or Firm* — Nathan O. Greene; Brinks Hofer Gilson & Lione

(57) ABSTRACT

Systems and methods for real-time validation of check image quality and readability of MICR line data are provided. A check image received by a financial institution can be assessed during a customer on-line session, so that the customer is informed in real-time whether the image is acceptable. Received check images are used to produce images in another format, which are then analyzed for specified requirements.

30 Claims, 7 Drawing Sheets

(56) References Cited

U.S. PATENT DOCUMENTS

| | | |
|---|---|---|
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard ........................ 705/75 |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard ........................ 705/75 |
| 6,038,553 A | 3/2000 | Hyde |
| 6,053,405 A | 4/2000 | Irwin, Jr. et al. |
| 6,073,119 A | 6/2000 | Bornemisza-wahr |
| 6,085,168 A | 7/2000 | Mori |
| 6,097,834 A | 8/2000 | Krouse |
| 6,097,885 A | 8/2000 | Rayner |
| 6,105,865 A | 8/2000 | Hardesty |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-chu |
| 6,450,403 B1 | 9/2002 | Martens et al. ................ 235/379 |
| 6,464,134 B1 | 10/2002 | Page |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 * | 8/2003 | Anderson et al. ............. 713/176 |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |
| 6,711,474 B1 | 3/2004 | Treyz et al. |
| 6,726,097 B2 | 4/2004 | Graef |
| 6,728,397 B2 | 4/2004 | Mcneal |
| 6,738,496 B1 | 5/2004 | Van Hall |
| 6,742,128 B1 | 5/2004 | Joiner |
| 6,745,186 B1 | 6/2004 | Testa et al. |
| 6,755,340 B1 | 6/2004 | Voss |
| 6,763,226 B1 | 7/2004 | McZeal |
| 6,781,962 B1 | 8/2004 | Williams |
| 6,786,398 B1 | 9/2004 | Stinson |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |

| Patent | Date | Name |
|---|---|---|
| 6,829,704 B2 | 12/2004 | Zhang |
| 6,844,885 B2 | 1/2005 | Anderson |
| 6,856,965 B1 | 2/2005 | Stinson |
| 6,863,214 B2 * | 3/2005 | Garner et al. ............... 235/379 |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky et al. |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,433,098 B2 * | 10/2008 | Klein et al. ............... 358/505 |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Statou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,644,043 B2 | 1/2010 | Minowa |
| 7,647,275 B2 | 1/2010 | Jones |
| 7,668,363 B2 | 2/2010 | Price |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder |
| 7,734,545 B1 | 6/2010 | Fogliano |
| 7,743,979 B2 | 6/2010 | Fredman |
| 7,753,268 B1 | 7/2010 | Robinson et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 * | 10/2010 | Murata ............... 235/379 |
| 7,818,245 B2 | 10/2010 | Prakash et al. |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,912,785 B1 | 3/2011 | Kay |
| 7,949,587 B1 | 5/2011 | Morris et al. |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |

| | | |
|---|---|---|
| 8,001,051 B1 | 8/2011 | Smith et al. |
| 8,046,301 B1 | 10/2011 | Smith et al. |
| 2001/0014881 A1 | 8/2001 | Drummond |
| 2001/0018739 A1 | 8/2001 | Anderson |
| 2001/0027994 A1 | 10/2001 | Hayashida |
| 2001/0042171 A1 | 11/2001 | Vermeulen |
| 2001/0042785 A1 | 11/2001 | Walker |
| 2001/0043748 A1 | 11/2001 | Wesolkowski |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. ............... 705/70 |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta |
| 2002/0171820 A1 | 11/2002 | Okamura |
| 2002/0178112 A1 | 11/2002 | Goeller |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown et al. |
| 2003/0105714 A1 | 6/2003 | Alarcon-Luther et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig |
| 2004/0158549 A1 | 8/2004 | Matena |
| 2004/0165096 A1 | 8/2004 | Maeno |
| 2004/0170259 A1 | 9/2004 | Park |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0091161 A1 | 4/2005 | Gustin |
| 2005/0096992 A1 | 5/2005 | Geisel |
| 2005/0097046 A1 | 5/2005 | Singfield |
| 2005/0108164 A1 | 5/2005 | Salafia |
| 2005/0108168 A1 | 5/2005 | Halpin |
| 2005/0115110 A1 | 6/2005 | Dinkins |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0205661 A1 | 9/2005 | Taylor |
| 2005/0209961 A1 | 9/2005 | Michelsen |
| 2005/0228733 A1 | 10/2005 | Bent |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |

| | | | | | |
|---|---|---|---|---|---|
| 2006/0004660 A1 | 1/2006 | Pranger | 2007/0171288 A1 | 7/2007 | Inoue |
| 2006/0025697 A1 | 2/2006 | Kurzweil | 2007/0172107 A1 | 7/2007 | Jones et al. |
| 2006/0039628 A1 | 2/2006 | Li et al. | 2007/0172148 A1 | 7/2007 | Hawley |
| 2006/0039629 A1 | 2/2006 | Li | 2007/0179883 A1 | 8/2007 | Questembert |
| 2006/0041506 A1 | 2/2006 | Mason et al. | 2007/0183000 A1 | 8/2007 | Eisen et al. |
| 2006/0045321 A1 | 3/2006 | Yu | 2007/0194102 A1 | 8/2007 | Cohen |
| 2006/0047593 A1 | 3/2006 | Naratil | 2007/0198432 A1 | 8/2007 | Pitroda et al. |
| 2006/0053056 A1 | 3/2006 | Alspach-Goss | 2007/0203708 A1 | 8/2007 | Polcyn et al. |
| 2006/0059085 A1 | 3/2006 | Tucker | 2007/0208816 A1 | 9/2007 | Baldwin et al. |
| 2006/0064368 A1 | 3/2006 | Forte | 2007/0235518 A1 | 10/2007 | Mueller et al. |
| 2006/0080245 A1 | 4/2006 | Bahl | 2007/0235520 A1 | 10/2007 | Smith et al. |
| 2006/0085357 A1 | 4/2006 | Pizarro | 2007/0241179 A1 | 10/2007 | Davis |
| 2006/0102704 A1 | 5/2006 | Reynders | 2007/0244782 A1 | 10/2007 | Chimento |
| 2006/0106691 A1 | 5/2006 | Sheaffer | 2007/0246525 A1 | 10/2007 | Smith et al. |
| 2006/0106717 A1 | 5/2006 | Randle | 2007/0251992 A1 | 11/2007 | Sharma et al. |
| 2006/0110063 A1 | 5/2006 | Weiss | 2007/0255652 A1 | 11/2007 | Tumminaro |
| 2006/0112013 A1 | 5/2006 | Maloney | 2007/0255653 A1 | 11/2007 | Tumminaro |
| 2006/0115110 A1 | 6/2006 | Rodriguez | 2007/0255662 A1 | 11/2007 | Tumminaro |
| 2006/0115141 A1 | 6/2006 | NaohikoKoakutsu | 2007/0258634 A1 | 11/2007 | Simonoff |
| 2006/0118613 A1 | 6/2006 | McMann | 2007/0271182 A1 | 11/2007 | Prakash et al. |
| 2006/0144924 A1 | 7/2006 | Stover | 2007/0278286 A1 | 12/2007 | Crowell et al. |
| 2006/0144950 A1 | 7/2006 | Johnson | 2007/0288380 A1 | 12/2007 | Starrs |
| 2006/0161501 A1 | 7/2006 | Waserstein | 2007/0288382 A1 | 12/2007 | Narayanan et al. |
| 2006/0164682 A1 | 7/2006 | Lev | 2007/0295803 A1 | 12/2007 | Levine et al. |
| 2006/0167818 A1 | 7/2006 | Wentker et al. | 2008/0002911 A1 | 1/2008 | Eisen |
| 2006/0182331 A1 | 8/2006 | Gilson et al. | 2008/0021802 A1 | 1/2008 | Pendleton |
| 2006/0182332 A1 | 8/2006 | Weber | 2008/0040280 A1 | 2/2008 | Davis et al. |
| 2006/0206506 A1 | 9/2006 | Fitzpatrick | 2008/0052182 A1 | 2/2008 | Marshall |
| 2006/0210138 A1 | 9/2006 | Hilton et al. | 2008/0059376 A1 | 3/2008 | Davis |
| 2006/0214940 A1 | 9/2006 | Kinoshita | 2008/0063253 A1 | 3/2008 | Wood |
| 2006/0215204 A1 | 9/2006 | Miyamoto et al. | 2008/0068674 A1 | 3/2008 | McIntyre |
| 2006/0215230 A1 | 9/2006 | Borrey et al. | 2008/0071721 A1 | 3/2008 | Wang |
| 2006/0222260 A1 | 10/2006 | Sambongi et al. | 2008/0080760 A1 | 4/2008 | Ronca |
| 2006/0229976 A1 | 10/2006 | Jung | 2008/0086420 A1* | 4/2008 | Gilder et al. .......... 705/44 |
| 2006/0229986 A1 | 10/2006 | Corder | 2008/0086421 A1 | 4/2008 | Gilder |
| 2006/0238503 A1 | 10/2006 | Smith | 2008/0091599 A1 | 4/2008 | Foss, Jr. |
| 2006/0242062 A1 | 10/2006 | Peterson | 2008/0097899 A1 | 4/2008 | Jackson et al. |
| 2006/0242063 A1 | 10/2006 | Peterson | 2008/0103790 A1 | 5/2008 | Abernethy |
| 2006/0249567 A1 | 11/2006 | Byrne | 2008/0103967 A1 | 5/2008 | Ackert et al. |
| 2006/0274164 A1 | 12/2006 | Kimura et al. | 2008/0113674 A1 | 5/2008 | Baig |
| 2006/0279628 A1 | 12/2006 | Fleming | 2008/0114739 A1 | 5/2008 | Hayes |
| 2006/0282383 A1 | 12/2006 | Doran | 2008/0117991 A1 | 5/2008 | Peddireddy |
| 2006/0291744 A1 | 12/2006 | Ikeda et al. | 2008/0119178 A1 | 5/2008 | Peddireddy |
| 2007/0016796 A1 | 1/2007 | Singhal | 2008/0133411 A1 | 6/2008 | Jones et al. |
| 2007/0019243 A1 | 1/2007 | Sato | 2008/0147549 A1 | 6/2008 | Rathbun |
| 2007/0022053 A1 | 1/2007 | Waserstein | 2008/0156438 A1 | 7/2008 | Stumphauzer |
| 2007/0027802 A1 | 2/2007 | VanDeburg et al. | 2008/0162350 A1 | 7/2008 | Allen-Rouman et al. |
| 2007/0031022 A1 | 2/2007 | Frew | 2008/0162371 A1 | 7/2008 | Rampell et al. |
| 2007/0038561 A1 | 2/2007 | Vancini et al. | 2008/0177659 A1 | 7/2008 | Lacey et al. |
| 2007/0041629 A1 | 2/2007 | Prakash et al. | 2008/0180750 A1 | 7/2008 | Feldman |
| 2007/0050292 A1 | 3/2007 | Yarbrough | 2008/0208727 A1* | 8/2008 | McLaughlin et al. .......... 705/35 |
| 2007/0053574 A1 | 3/2007 | Verma et al. | 2008/0214180 A1 | 9/2008 | Cunningham et al. |
| 2007/0058851 A1 | 3/2007 | Quine | 2008/0219543 A1 | 9/2008 | Csulits |
| 2007/0063016 A1 | 3/2007 | Myatt | 2008/0245869 A1 | 10/2008 | Berkun et al. |
| 2007/0064991 A1 | 3/2007 | Douglas et al. | 2008/0247629 A1 | 10/2008 | Gilder |
| 2007/0065143 A1 | 3/2007 | Didow et al. | 2008/0247655 A1 | 10/2008 | Yano |
| 2007/0075772 A1 | 4/2007 | Kokubo | 2008/0249931 A1 | 10/2008 | Gilder |
| 2007/0076940 A1 | 4/2007 | Goodall et al. | 2008/0249951 A1 | 10/2008 | Gilder et al. |
| 2007/0076941 A1 | 4/2007 | Carreon et al. | 2008/0262953 A1 | 10/2008 | Anderson |
| 2007/0077921 A1 | 4/2007 | Hayashi | 2008/0275821 A1 | 11/2008 | Bishop et al. |
| 2007/0080207 A1 | 4/2007 | Williams | 2008/0316542 A1 | 12/2008 | Mindrum et al. |
| 2007/0082700 A1 | 4/2007 | Landschaft | 2009/0024520 A1 | 1/2009 | Drory et al. |
| 2007/0084911 A1 | 4/2007 | Crowell | 2009/0046938 A1 | 2/2009 | Yoder |
| 2007/0086642 A1 | 4/2007 | Foth | 2009/0060396 A1 | 3/2009 | Blessan et al. |
| 2007/0086643 A1 | 4/2007 | Spier | 2009/0108080 A1 | 4/2009 | Meyer |
| 2007/0094088 A1 | 4/2007 | Mastie | 2009/0110281 A1 | 4/2009 | Hirabayashi |
| 2007/0100748 A1 | 5/2007 | Dheer | 2009/0141962 A1 | 6/2009 | Borgia |
| 2007/0110277 A1 | 5/2007 | Hayduchok et al. | 2009/0171819 A1 | 7/2009 | Emde et al. |
| 2007/0118472 A1 | 5/2007 | Allen-Rouman et al. | 2009/0171825 A1 | 7/2009 | Roman |
| 2007/0122024 A1 | 5/2007 | Haas et al. | 2009/0173781 A1 | 7/2009 | Ramachandran |
| 2007/0127805 A1 | 6/2007 | Foth et al. | 2009/0190823 A1 | 7/2009 | Walters |
| 2007/0129955 A1 | 6/2007 | Dalmia | 2009/0192938 A1 | 7/2009 | Amos |
| 2007/0136198 A1 | 6/2007 | Foth et al. | 2009/0236413 A1 | 9/2009 | Mueller et al. |
| 2007/0140545 A1 | 6/2007 | Rossignoli | 2009/0252437 A1 | 10/2009 | Li |
| 2007/0140594 A1 | 6/2007 | Franklin | 2009/0281904 A1 | 11/2009 | Pharris |
| 2007/0143208 A1 | 6/2007 | Varga | 2009/0313167 A1 | 12/2009 | Dujari |
| 2007/0150337 A1 | 6/2007 | Hawkins et al. | 2010/0007899 A1 | 1/2010 | Lay |
| 2007/0156438 A1 | 7/2007 | Popadic | 2010/0027679 A1 | 2/2010 | Sunahara et al. |
| 2007/0168265 A1 | 7/2007 | Rosenberger | 2010/0047000 A1 | 2/2010 | Park et al. |

| | | | |
|---|---|---|---|
| 2010/0057578 | A1 | 3/2010 | Blair et al. |
| 2010/0061446 | A1 | 3/2010 | Hands et al. |
| 2010/0082470 | A1 | 4/2010 | Walach |
| 2010/0165015 | A1 | 7/2010 | Barkley et al. |
| 2010/0260408 | A1 | 10/2010 | Prakash et al. |
| 2010/0262522 | A1 | 10/2010 | Anderson et al. |
| 2010/0312705 | A1 | 12/2010 | Caruso et al. |
| 2011/0112967 | A1 | 5/2011 | Anderson et al. |

OTHER PUBLICATIONS

Heckenberg, D., "Using Mac OS X for Real-Time Image Processing," 2003, 10, 1-10.
Image Master, "Photo Restoration: We specialize in digital photo restoration and photograph repair of family pictures," http://www.imphotorepair.com/, downloaded Apr. 2, 2007, 1 page.
OnlineChck.com/Merchant Advisors, "Real-Time Check Debit," *Merchant Advisors: Retail Check Processing Check Conversion*, http://www.onlinecheck.com/wach/rcareal.htm, 2006, downloaded Apr. 2, 2007, 3 pages.
RemoteDepositCapture.com, LLC, "Remote Deposit Capture Overview," *RDC Overview*, http://remotedepositcapture.com/Overview/RDC_Overview.htm, 2006, downloaded Apr. 2, 2007, 4 pages.
White, J.M. et al., "Image Thresholding for Optical Character Recognition and Other Applications Requiring Character Image Extraction", IBM J. Res. Development, Jul. 1983, vol. 27, No. 4 (12 pgs).
Ritzer, J.R. "Hinky Dinky helped spearhead POS, remote banking movement", Bank Systems and Equipment, vol. 21, No. 12, Dec. 1984 (1 pg).
Dinan, R.F. et al., "Image Plus High Performance Transaction System", IBM Systems Journal, 1990 vol. 29, No. 3 (14 pgs).
Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).
Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).
Zhang, C.Y., "Robust Estimation and Image Combining" Astronomical Data Analysis Software and Systems IV, ASP Conference Series, 1995 (5 pgs).
Kornai Andras et al., "Recognition of Cursive Writing on Personal Checks", Proceedings of International Workshop on the Frontiers in Handwritting Recognition, Cited in patent No. 7,900,822, as dated Sep. 1996, (6 pgs).
De Queiroz, Ricardo et al., "Mixed Raster Content (MRC) Model for Compound Image Compression", 1998 (14 pgs).
Rivlin, Alice M. et al., Chair, Vice Chair—Board of Governors, Committee on the Federal Reserve in the Payments Mechanism—Federal Reserve System, " the Federal Reserve in the Payments Mechanism", Jan. 1998 (41 pgs).
Tygar, J.D., Atomicity in Electronic Commerce, in ACM Networker, 2:2, Apr./May 1998 (12 pgs).
Anderson, Milton M. "FSML and Echeck", Financial Services Technology Consortium, 1999 (17 pgs).
"Full Service Direct Deposit", www.nonprofitstaffing.com/images/upload/dirdepform.pdf. Cited in patent No. 7,900,822, as dated 2001, (2 pgs).
Craig, Ben, "Resisting Electronic Payment Systems: Burning Down the House?", Federal Reserve Bank of Cleveland, Jul. 1999 (4 pgs).
Rose, Sarah et al., "Best of the Web: The Top 50 Financial Websites", Money, New York, Dec. 1999, vol. 28, Iss. 12 (8 pgs).
Furst, Karen et al., "Internet Banking: Developments and Prospects", Economic and Policy Analysis Working Paper 2000-9, Sep. 2000 (60 pgs).
"Middleware", David E. Bakken, Encyclopedia of Distributed Computing, Kluwer Academic Press, 2001 (6 pgs).
Palacios, Rafael et al., "Automatic Processing of Brazilian Bank Checks". Cited in patent No. 7,900,822, as dated 2002 (28 pgs).
Wallison, Peter J., "Wal-Mart Case Exposes Flaws in Banking-Commerce Split", American Banker, vol. 167. No. 8, Jan. 11, 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Blafore, Bonnie "Lower Commissions, Fewer Amenities", Better Investing, Madison Heights: Feb. 2003, vol. 52, Iss 6, (4 pgs).
"Direct Deposit Authorization Form", www.umass.edu/humres/library/DDForm.pdf, May 2003 (3 pgs).
"Electronic Billing Problem: The E-check is in the mail" American Banker—vol. 168, No. 95, May 19, 2003 (4 pgs).
Oxley, Michael G., from committee on Financial Services; "Check Clearing for the $21^{st}$ Century Act", $108^{th}$ Congress, $1^{st}$ Session House of Representatives report 108-132, Jun. 2003 (20 pgs).
Shelby, Hon. Richard C. (Committee on Banking, Housing and Urban Affairs); "Check Truncation Act of 2003", calendar No. 168, $108^{th}$ Congress, $1^{st}$ Session Senate report 108-79, Jun. 2003 (27 pgs).
Knestout, Brian P. et al., "Banking Made Easy" Kiplinger's Personal Finance Washington, Jul. 2003, vol. 57, Iss 7 (5 pgs).
Oxley, Michael G., from the committee of conference; "Check Clearing for the $21^{st}$ Century Act" $108^{th}$ Congress, $1^{st}$ Session Senate report 108-291, Oct. 1, 2003 (27 pgs).
Public Law 108-100, 108 Congress; "An Act Check Clearing for the $21^{st}$ Century Act", Oct. 28, 2003, 117 STAT. 1177 (18 pgs).
Johnson, Jennifer J., Secretary of the Board; Federal Reserve System, 12 CFR Part 229, Regulation CC; "Availability of Funds and Collection of Checks". Cited in patent No. 7,900,822, as dated 2009, (89 pgs).
Mohl, Bruce, "Banks Reimbursing ATM Fee to Compete With Larger Rivals", Boston Globe, Boston, MA, Sep. 19, 2004 (3 pgs).
The Automated Clearinghouse, "Retail Payment Systems; Payment Instruments and Settlement: The Automated Clearinghouse (ACH)", www.ffiec.gov/ffiecinfobase/booklets/retailretail_02d.html, Cited in patent Clearing No. 7,900,822, as dated Dec. 2005 (3 pgs).
"Two Words Every Business Should Know: Remote Deposit," Canon, http://www.rpsolutions.com/rpweb/pdfs/canon_rdc.pdf, 2005 (7 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Constanzo, Chris, "Remote Check Deposit: Wells Captures A New Checking Twist", Bank Technology News Article—May 2005, www.americanbanker.com/btn_article.html?id=20050502YQ50FSYG (2 pgs).
German Shegalov, Diplom-Informatiker, "Integrated Data, Message, and Process Recovery for Failure Masking in Web Services", Dissertation Jul. 2005 (146 pgs).
Credit Union Journal, "AFCU Averaging 80 DepositHome Transactions Per Day", Credit Union Journal, Aug. 15, 2005 (1 pg).
BankServ, "DepositNow: What's the difference?" Cited in patent No. 7,970,677, as dated 2006, (4 pgs).
BankServ, Product Overview, http://www.bankserv.com/products/remotedeposit.htm, Cited in patent No. 7,970,677, as dated 2006, (3 pgs).
Blue Mountain Consulting, from URL: www.bluemontainconsulting.com, Cited in patent No. 7,900,822, as dated Apr. 26, 2006 (3 pgs).
Remotedepositcapture, URL:www.remotedepositcapture.com, Cited in patent No. 7,900,822, as dated 2006 (5 pgs).
"Compliance with Regulation CC", http./www/federalreserve.gov/Pubs/regcc/regcc.htm, Jan. 24, 2006 (6 pgs).
Chiang, Chuck, The Bulletin, "Remote banking offered", http://bendbulletin.com/apps/pbcs.dll/article?AID=/20060201/BIZ0102/602010327&templ . . . Feb. 1, 2006 (2 pgs).
Federal Reserve Board, "Check Clearing for the $21^{st}$ Century Act", FRB, http://www.federalreserve.gov/paymentsystems/truncation/, Mar. 1, 2006 (1 pg).
Fest, Glen., "Patently Unaware" Bank Technology News, Apr. 2006, Retrieved from the internet at URL:http://banktechnews.com/article.html?id=2006403T7612618 (5 pgs).
Bank Systems & Technology, Untitled Article, May 1, 2006, http://www.banktech.com/showarticle.jhtml?_articleID=187003126, "Are you Winning in the Payment World?" (4 pgs).

Digital Transactions News, "An ACH-Image Proposal for Check Rolls Banks and Networks" May 26, 2006 (3 pgs).
RemoteDepositCapture.com, Remote Deposit Capture News Articles from Jul. 6, 2006, "BankServ Announces New Remote Deposit Product Integrated with QuickBooks" (3 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
Dias, Danilo et al., "A Model for the Electronic Representation of Bank Checks", Brasilia Univ. Oct. 2006 (5 pgs).
"Check Fraud: A Guide to Avoiding Losses", All Net, http://all.net/books/audit/checkfraud/security.htm, Cited in patent No. 7,900,822, as dated 2007 (1 pg).
"What is check Fraud", National Check Fraud Center, http://www.ckfraud.org/ckfraud.html, Cited in patent No. 7,900,822, as dated 2007 (12 pgs).
"Remote Deposit" National City, http://www.nationalcity.com/smallbusiness/cashmanagement/remotedeposit/default.asp; Cited in patent No. 7,900,822, as dated 2007 (1 pg).
"Remote Deposit Capture", Plante & Moran, http://plantemoran.com/industries/fincial/institutions/bank/resources/community+bank+advisor/2007+symmer+issue/remote+deposit+capture.htm, Cited in patent No. 7,900,822, as dated 2007 (3 pgs).
"Virtual Bank Checks", Morebusiness.com, http://www.morebusiness.com/running_yourbusiness/businessbits/d908484987,brc, Cited in patent No. 7,900,822, as dated 2007 (3 pgs).
"It's the easiest way to Switch banks", LNB, http://www.inbky.com/pdf/LNBswitch-kit10-07.pdf Cited in patent No. 7,996,316, as dated 2007 (7 pgs).
"Lesson 38—More Bank Transactions", Turtle Soft, http://www.turtlesoft.com/goldenseal-software-manual.lesson38.htm, Cited in patent No. 7,900,822, as dated 2007 (8 pgs).
"Personal Finance", PNC, http://www.pnc.com/webapp/unsec/productsandservice.do?sitearea=/PNC/home/personal/account+services/quick+switch/quick+switch+faqs, Cited in patent No. 7,900,822, as dated 2007 (12 pgs).
"Switching Made Easy," Bank of North Georgia, http://www.banknorthgeorgia.com/cmsmaster/documents/286/documents616.pdf, 2007 (7 pgs).
"Chapter 7 Payroll Programs," Uniform Staff Payroll System, http://www2.oecn.k12.oh.us/www/ssdt/usps/usps_user_guide_005.html, Cited in patent No. 7,900,822, as dated 2007 (9 pgs).
"Check 21 Solutions," Columbia Financial International, Inc. http://www.columbiafinancial.us/check21/solutions.htm, Cited in patent No. 7,900,822, as dated 2007 (8 pgs).
"Direct Deposit," University of Washington, http://www.washington.edu/admin/payroll/directdeposit.html, Cited in No. 7,900,822, as dated 2007 (3 pgs).
"Accept "Customer Not Present" Checks," Accept Check Online, http://checksoftware.com, Cited in patent No. 7,900,822, as dated 2007 (1 pg).
"Customer Personalized Bank Checks and Address Labels" Checks Your Way Inc., http://www.checksyourway.com/htm/web_pages/faq.htm, Cited in No. 7,900,822, as dated 2007 (6 pgs).
"Direct Deposit Application for Payroll", Purdue University, Business Office Form 0003, http://purdue.edu/payroll/pdf/directdepositapplication.pdf, Jul. 2007 (2 pgs).
"Frequently Asked Questions" Bank of America, http://www/bankofamerica.com/deposits/checksave/index.cfm?template-lc_faq_bymail, Cited in patent No. 7,900,822, as dated 2007 (2 pgs).
"Refractive index" Wikipedia, the free encyclopedia; http://en.wikipedia.org./wiki/refractiveindex.com Oct. 16, 2007 (4 pgs).
Patterson, Scott "USAA Deposit@Home—Another WOW moment for Net Banking", NextCU.com, Jan. 26, 2007 (5 pgs).
Board of Governors of the federal reserve system, "Report to the Congress on the Check Clearing for the 21st Century Act of 2003" Apr. 2007, Submitted to Congress pursuant to section 16 of the Check Clearing for the 21st Century Act of 2003, (59 pgs).
"Save on ATM Fees", RedEye Edition, Chicago Tribune, Chicago, IL Jun. 30, 2007 (2 pgs).

Associate of German Banks, SEPA 2008: Uniform Payment Instruments for Europe, Berlin, Cited in patent No. 7,900,822, as dated Jul. 2007, Bundesverbankd deutscher banker ev (42 pgs).
Affinity Federal Credit Union, "Affinity Announces Online Deposit," Aug. 4, 2005 (1 pg).
"Check 21—The check is not in the post", RedTitan Technology 2004 http://www.redtitan.com/check21/htm (3 pgs).
Hartly, Thomas, "Banks Check Out New Image", Business First, Buffalo: Jul. 19, 2004, vol. 20, Issue 43, (3 pgs).
Wade, Will, "Early Notes: Updating Consumers on Check 21" American Banker Aug. 10, 2004 (3 pgs).
Rao, Bharat; "The Internet and the Revolution in Distribution: A Cross-Industry Examination"; Technology in Society; 1999; pp. 287-306; vol. 21, No. 3 (20 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Kiser, Elizabeth K.; "Modeling the Whole Firm: The Effect of Multiple Inputs and Financial Intermediation on Bank Deposit Rates;" FEDS Working Paper No. 2004-07; Jun. 3, 2003; pp. 1-46 (46 pgs).
DeYoung, Robert; "The Financial Performance of Pure Play Internet Banks"; Federal Reserve Bank of Chicago Economic Perspectives; 2001; pp. 60-75; vol. 25, No. 1 (16pgs).
Archive Index Systems; Panini My Vision X-30 or VX30 or X30 © 1994-2008 Archive Systems, Inc. P./O. Box 40135 Bellevue, WA USA 98015 (2 pgs).
Office Action from corresponding U.S. Appl. No. 11/747,219 dated Nov. 26, 2010 (61 pgs).
Office Action from corresponding U.S. Appl. No. 11/747,219 dated May 6, 2011 (56 pgs).
Office Action from corresponding U.S. Appl. No. 11/747,222 dated Dec. 10, 2010 (14 pgs).
"Adjusting Brightness and Contrast", www.eaglesoftware.com/adjustin.htm, retrieved on May 4, 2009 (4 pgs).
"Best practices for producing quality digital image files," Digital Images Guidelines, http://deepblue.lib.umich.edu/bitstream/2027.42/40247/1/Images-Best_Practice.pdf, downloaded 2007 (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"Mitek Systems Announces Mobile Deposit Application for Apple iPhone," http://prnewswire.com/cgi-bin/stories/pl?ACCT=104&Story=/www/story/10-01-..., Nov. 25, 2008 (2 pgs).
"WallStreetGrapevine.com" Stocks on the Rise: JADG, BKYI, MITK; Mar. 3, 2008 (4 pgs).
Albrecht, W. Steve, "Check Kiting: Detection, Prosecution and Prevention," The FBI Law Enforcement Bulletin, Nov. 1, 1993 (6 pgs).
Amber Avalona-Butler/Paraglide, "At Your Service: Best iPhone Apps for Military Lifestyle," Jul. 9, 2010 (2 pgs).
Automated Merchant Systems, Inc., "Electronic Check Conversion," http://www.automatedmerchant.com/electronic_check_conversion.cfm, 2006, downloaded Oct. 18, 2006 (3 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Bruene, Jim; "Check Free to Enable In-Home Remote Check Deposit for Consumers and Small Business", NetBanker. Com, Financial Insite, Inc., http://www.netbanker.com/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbanker.com/2008/04/digital_federal_credit_union_a.html, Apr. 13, 2008 (3 pgs).
Bruno, M., "Instant Messaging," Bank Technology News, Dec. 2002 (3 pgs).
Canon, ImageFormula CR-25/CR-55, "Improve Your Bottom Line with Front-Line Efficiencies", 0117W117, 1207-55/25-1 OM-BSP, Cited in U.S. Pat. No. 7,949,587 as dated 2007. (4 pgs).

Carrubba, P. et al., "Remote Deposit Capture: A White Paper Addressing Regulatory, Operational and Risk Issues," NetDeposit Inc., 2006 (11 pgs).
Century Remote Deposit High-Speed Scanner Users Manual Release 2006, (Century Manual), Century Bank, 2006, (32 pgs).
CNN.com/technology, "Scan, deposit checks from home", www.cnn.com/2008ITECH/biztech/02/07/check.scanning.ap/index.html, Feb. 7, 2008 (3 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411EODZT57G, Apr. 14, 2008 (1 pg).
DCU Member's Monthly—Jan. 2008, "PC Deposit—Deposit Checks from Home!", http://www.mycreditunionnewsletter.com/dcu/01 08/page1.html, Copyright 2008 Digital Federal Credit Union (2 pgs).
De Jesus, A. et al., "Distributed Check Processing in a Check 21 Environment: An educational overview of the opportunities and challenges associated with implementing distributed check imaging and processing solutions," Panini, 2004, pp. 1-22.
Debello, James et al., "RDM and Mitek Systems to Provide Mobile Check Deposit," Mitek Systems, Inc., San Diego, California and Waterloo, Ontario, (Feb. 24, 2009), 2 pgs.
eCU Technologies, "Upost Remote Deposit Solution," Retrieved from the internet https://www.eutechnologies.com/products/upost.html, downloaded 2009 (1 pg).
EFT Network Unveils FAXTellerPlus, EFT Network, Inc., www.eftnetwork.com, Jan. 13, 2009 (2 pgs).
ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).
Federal Reserve System, "12 CFR, Part 229: Availability of Funds and Collection of Checks," Federal Registrar, Apr. 28, 1997, pp. 1-50.
Federal Reserve System, "Part IV, 12 CFR Part 229: Availability of Funds and Collection of Checks; Final Rule," Federal Registrar, vol. 69, No. 149, Aug. 4, 2004, pp. 47290-47328.
Fidelity Information Services, "Strategic Vision Embraces Major Changes in Financial Services Solutions: Fidelity's long-term product strategy ushers in new era of application design and processing," Insight, 2004, pp. 1-14.
Fisher, Dan M., "Home Banking in the 21st Century: Remote Capture Has Gone Retail", May 2008 (4 pgs).
Garry, M., "Checking Options: Retailers face an evolving landscape for electronic check processing that will require them to choose among several scenarios," Supermarket News, vol. 53, No. 49, 2005 (3 pgs).
Gupta, Maya R. et al., "OCR binarization and image pre-processing for searching historical documents," Pattern Recognition, vol. 40, No. 2, Feb. 2007, pp. 389-397.
Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).
Hildebrand, C. et al., "Electronic Money," Oracle, http://www.oracle.com/oramag/profit/05-feb/p15financial.html, 2005, downloaded Oct. 18, 2006 (5 pgs).
Hillebrand, G., "Questions and Answers About the Check Clearing for the 21st Century Act, 'Check 21,'" ConsumersUnion.org, http://www.consumersunion.org/finance/ckclear1002.htm, Jul. 27, 2004, downloaded Oct. 18, 2006 (6 pgs).
Investment Systems Company, "Portfolio Accounting System," 2000, pp. 1-32.
JBC, "What is a MICR Line?," eHow.com, retrieved from http://www.ehow.com/about_4684793_what-micr-line.html on May 4, 2009 (2 pgs).
Kendrick, Kevin B., "Check Kiting, Float for Purposes of Profit," Bank Security & Fraud Prevention, vol. 1, No. 2, 1994 (3 pgs).
Levitin, Adam J., Remote Deposit Capture: A Legal and Transactional Overview, Banking Law Journal, p. 115, 2009 (RDC).

Matthews, Deborah, "Advanced Technology Makes Remote Deposit Capture Less Risky," Indiana Bankers Association, Apr. 2008 (2 pgs).
Metro 1 Credit Union, "Remote Banking Services," hltp://ww\\i.metro1cu.org/metro1cu/remote.html, downloaded Apr. 17, 2007 (4 pgs).
Mitek systems, "Imagenet Mobile Deposit", San Diego, CA, downloaded 2009 (2 pgs).
Mitek Systems: Mitek Systems Launches First Mobile Check Deposit and Bill Pay Application, San Diego, CA, Jan. 22, 2008 (3 pgs).
Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi_qa3799/is200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fisery Research Finds Banks are Interested in Offering Mobile Deposit Capture as an," Fiserv, Inc. Brookfield, Wis., (Business Wire), (Feb. 20, 2009) (2 pgs).
Online Deposit: Frequently Asked Questions, http://www.depositnow.com/faq.html, Copyright 2008 (1 pg).
Richey, J. C. et al., "EE 4530 Check Imaging," Nov. 18, 2008 (10 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html Nov. 16, 2010) (2 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Valentine, Lisa, "Remote Deposit Capture Hot Just Got Hotter," ABA Banking Journal, Mar. 2006, p. 1-9.
Wells Fargo Commercial, "Remote Deposit", www.wellsfargo.com/com/treasury_mgmtlreceivables/electronic/remote_deposit, Copyright 2008 (1 pg).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pgs).
Wikipedia ®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, NewYork, N.Y.: Feb 13, 2009, vol. 174, Iss. 30, p. 12. (2 pgs).
Woody Baird Associated Press, "Pastors Wife got Scammed—She Apparently Fell for Overseas Money Scheme," The Commercial Appeal, Jul. 1, 2006, p. A. 1.
Zions Bancorporation, "Moneytech, the technology of money in our world: Remote Deposit," http://www.bankjunior.com/pground/moneytech/remote_deposit.jsp, 2007 (2 pgs).
Application as filed on Apr. 3, 2008 for U.S. Appl. No. 12/062,143 (27 pgs).
Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Aug. 28, 2009 for U.S. Appl. No. 12/549,443 (41 pgs).
Application as filed on Dec. 20, 2006 for U.S. Appl. No. 11/613,656 (21 pgs).

Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Dec. 30, 2010 for U.S. Appl. No. 12/982,594 (275 pgs).
Application as filed on Feb. 18, 2009 for U.S. Appl. No. 12/388,005 (37 pgs).
Application filed on Jul. 13, 2006 for U.S. Appl. No. 11/487,537 (23 pgs).
Application filed on Jul. 27, 2009 for U.S. Appl. No. 12/509,613 (48 pgs).
Application filed on Jul. 27, 2009 for U.S. Appl. No. 12/509,680 (41 pgs).
Application filed on Jun. 11, 2008 for U.S. Appl. No. 12/137,051 (29 pgs).
Application filed on Jun. 8, 2011 for U.S. Appl. No. 13/155,976 (352 pgs).
Application filed on Jun. 8, 2011 for U.S. Appl. No. 13/156,007 (356 pgs).
Application filed on Jun. 8, 2011 for U.S. Appl. No. 13/156,018 (353 pgs).
Application filed on Mar. 15, 2007 for U.S. Appl. No. 11/686,924 (34 pgs).
Application filed on Mar. 15, 2007 for U.S. Appl. No. 11/686,928 (36 pgs).
Application filed on Mar. 4, 2009 for U.S. Appl. No. 12/397,671 (40 pgs).
Application filed on Mar. 4, 2009 for U.S. Appl. No. 12/397,930 (37 pgs).
Application filed on May 10, 2007 for U.S. Appl. No. 11/747,222 (35 pgs).
Application filed on Oct. 17, 2008 for U.S. Appl. No. 12/253,278 (42 pgs).
Application filed on Oct. 23, 2007 for U.S. Appl. No. 11/876,925 (36 pgs).
Application filed on Oct. 23, 2007 for U.S. Appl. No. 11/877,335 (29 pgs).
Application filed on Oct. 25, 2007 for U.S. Appl. No. 11/923,839 (22 pgs).
Application filed on Oct. 29, 2007 for U.S. Appl. No. 11/926,388 (23 pgs).
Application filed on Oct. 30, 2007 for U.S. Appl. No. 11/928,297 (26 pgs).
Application filed on Oct. 31, 2006 for U.S. Appl. No. 11/590,974 (31 pgs).
Application filed on Oct. 31, 2006 for U.S. Appl. No. 11/591,008 (27 pgs).
Application filed on Oct. 31, 2006 for U.S. Appl. No. 11/591,227 (58 pgs).
Application filed on Oct. 31, 2006 for U.S. Appl. No. 11/591,273 (56 pgs).
Application filed on Oct. 31, 2007 for U.S. Appl. No. 11/930,537 (27 pgs).
Application filed on Oct. 31, 2007 for U.S. Appl. No. 11/931,670 (47 pgs).
Application filed on Oct. 8, 2007 for U.S. Appl. No. 11/868,884 (30 pgs).
Application filed on Sep. 28, 2007 for U.S. Appl. No. 11/864,569 (35 pgs).
Application filed on Sep. 8, 2008 for U.S. Appl. No. 12/205,996 (30 pgs).
Claims filed on Apr. 3, 2008 for U.S. Appl. No. 12/062,163 (3 pgs).
Claims filed on Apr. 3, 2008 for U.S. Appl. No. 12/062,175 (3 pgs).
Claims filed on Aug. 19, 2010 for U.S. Appl. No. 12/859,752 (5 pgs).
Claims filed on Dec. 15, 2011 for U.S. Appl. No. 13/327,478 (4 pgs).
Claims filed on Dec. 20, 2006 for U.S. Appl. No. 11/613,671 (3 pgs).
Claims filed on Dec. 8, 2010 for U.S. Appl. No. 12/963,513 (7 pgs).
Claims filed on Feb. 16, 2011 for U.S. Appl. No. 13/028,477 (3 pgs).
Claims filed on Jan. 20, 2011 for U.S. Appl. No. 13/010,644 (9 pgs).
Claims filed on Jan. 31, 2011 for U.S. Appl. No. 13/017,865 (11 pgs).
Claims filed on Mar. 15, 2007 for U.S. Appl. No. 11/686,925 (5 pgs).
Claims filed on May 10, 2007 for U.S. Appl. No. 11/747,223 (4 pgs).
Claims filed on May 18, 2011 for U.S. Appl. No. 13/110,077 (9 pgs).
Claims filed on May 2, 2011 for U.S. Appl. No. 13/098,566 (10 pgs).
Claims filed on Oct. 23, 2007 for U.S. Appl. No. 11/877,382 (6 pgs).
Claims filed on Oct. 2008 for U.S. Appl. No. 12/257,471 (4 pgs).
Claims filed on Oct. 31, 2006 for U.S. Appl. No. 11/590,963 (3 pgs).
Claims filed on Oct. 31, 2006 for U.S. Appl. No. 11/590,995 (3 pgs).
Claims filed on Oct. 31, 2006 for U.S. Appl. No. 11/590,998 (4 pgs).
Claims filed on Oct. 31, 2007 for U.S. Appl. No. 11/931,804 (4 pgs).
Claims filed on Oct. 8, 2007 for U.S. Appl. No. 11/868,878 (4 pgs).
Claims filed on Sep. 2, 2008 for U.S. Appl. No. 12/202,781 (4 pgs).
Claims filed on Sep. 8, 2008 for U.S. Appl. No. 12/206,001 (3 pgs).
Claims filed on Sep. 8, 2008 for U.S. Appl. No. 12/206,007 (3 pgs).
Notice of Allowance from corresponding U.S. Appl. No. 11/747,222 dated Jun. 8, 2011 (8 pgs).
Notice of Allowance from corresponding U.S. Appl. No. 11/747,222 dated Oct. 20, 2011 (7 pgs).
Notice of Allowance from corresponding U.S. Appl. No. 11/747,222 dated Feb. 1, 2012 (7 pgs).
Application filed on Feb. 15, 2012 for U.S. Appl. No. 13/397,405 (19 pgs).
Claims filed on Feb. 15, 2012 for U.S. Appl. No. 13/397,437 (6 pgs).
Claims filed on Dec. 29, 2005 for U.S. Appl. No. 11/320,998 (3 pgs).
Claims filed on Dec. 29, 2005 for U.S. Appl. No. 11/321,027 (3 pgs).

* cited by examiner

SYSTEMS AND METHODS FOR REAL-TIME VALIDATION OF CHECK IMAGE QUALITY

CROSS-REFERENCE TO RELATED APPLICATIONS

This application is related by subject matter to U.S. patent application Ser. No. 11/747,219 and U.S. patent application Ser. No. 11/747,222, both filed on even date herewith.

BACKGROUND

A variety of high-speed, special purpose check deposit systems for commercial use are available on the market today. Using such technologies, businesses can initiate deposits of large volumes of checks from remote non-bank locations. However, such technologies require specialized equipment, such as equipment that magnetically reads the Magnetic Ink Character Recognition (MICR) line printed across the bottom of checks. At present, individuals do not typically make use of such specialized equipment. Instead, most individuals deposit checks by presenting them at their bank, Automated Teller Machine (ATM), or by mail.

In the future, deposit at home systems may emerge, allowing individuals the flexibility and time savings of remote deposit. One such system is described in U.S. patent application Ser. No. 11/321,025. Such a system allows individuals to remotely deposit checks using a customer controlled general purpose computer with an Internet connection, and an image capture device such as a scanner or digital camera. A digital image of a check is made using the image capture device, and the customer computer sends the image to financial institution servers. The financial institution then processes the transaction using the received image.

Remote deposit systems adapted for personal use may prove advantageous for banks and bank customers alike, in part because they are well suited for today's mobile lifestyles experienced by individuals in military, government, and private sector careers, and in part because they successfully leverage electronic communications advances allowing unprecedented automation, speed, and security in deposit transactions.

However, technologies for automatically processing deposit transactions accurately and swiftly are in their infancy. Accuracy and speed are important to the financial institution, which is motivated by a desire for efficient, cost effective operation. They are equally important to the consumer, however, because consumers want to know with certainty at the time of deposit that the check was in fact received, meets the bank's requirements, and that the funds will be made available in their account in due course.

SUMMARY

The described embodiments contemplate a system, method and computer-readable medium with computer-executable instructions for real-time validation of check image quality. A check image received by a financial institution can be assessed during a customer on-line session, so that the customer is informed whether the image is acceptable in real-time.

In one embodiment, a method is provided for validating that a digital image of a check can be used in a deposit transaction. A digital image of a check in a first image format, such as the Joint Photographic Experts Group (JPEG) format, is received from a customer computer by financial institution electronics. Upon receiving the image, a series of automated steps may be triggered. The financial institution may produce a digital image of said check in a second image format, for example the Tag Image File Format (TIFF) that is presently required for inter-bank image transfer purposes by Check 21 legislation. Next, the financial institution may validate, in real time, that the digital image meets at least one image requirement, such as a requirement that the image is properly formatted, bitonal, has appropriate pixel density, is appropriately sized, of appropriate clarity, and the like. This may be done by the financial institution itself or outsourced to a $3^{rd}$ party service provider that exposes an appropriate Application Programming Interface (API). If the image meets the requirements, the financial institution electronically communicates an approval of the deposit transaction to the customer computer.

In another embodiment, a sequence of attempts to recognize a check MICR line are performed in real time, the sequence being optimized for greatest speed in the majority of instances, while generating as few failures as practical. A first attempt includes digital image analysis that is optimized for a digital image in a second image format and comprising a white border. A second attempt includes digital image analysis that is optimized for a digital image in said second image format and comprising a black border. A third attempt includes digital image analysis that is optimized for a digital image in a first image format and comprising a white border. A fourth attempt includes digital image analysis that is optimized for a digital image in said first image format and comprising a black border. If any attempt is successful, subsequent attempts can be foregone and an approval can be sent to the customer. An error is sent to the customer only if all attempts fail.

In another embodiment, a $3^{rd}$ party service is provided for validating check image quality. The third party may receive a digital image of a check from a financial institution server, for example a server that calls a $3^{rd}$ party API as described in the first embodiment above. In response to said receiving, the $3^{rd}$ party may automatically initiate an image validation process to ensure said digital image of a check meets an image requirement. A confirmation or an error is returned, in real time, to the financial institution. A confirmation is sent if the digital image of a check meets the image requirements. An error is sent if it does not.

Additional advantages and features of the invention are described below.

BRIEF DESCRIPTION OF THE DRAWINGS

The foregoing summary, as well as the following detailed description of preferred embodiments, is better understood when read in conjunction with the appended drawings. Exemplary embodiments are provided for the purposes of illustration; however the invention is not limited to the specific methods and instrumentalities disclosed. In the drawings.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

In general, it is contemplated that the various systems, methods, and computer readable media disclosed herein will be implemented within a system for processing remote deposit of checks. Such a system will generally include subsystems for electronically receiving check images from customers, said check images corresponding to at least one payor check, and for automatically initiating a deposit of funds associated with said payor check into a customer account. Such a system may also beneficially automatically initiate a process for clearing the payor check with a payor bank.

Figure 1:
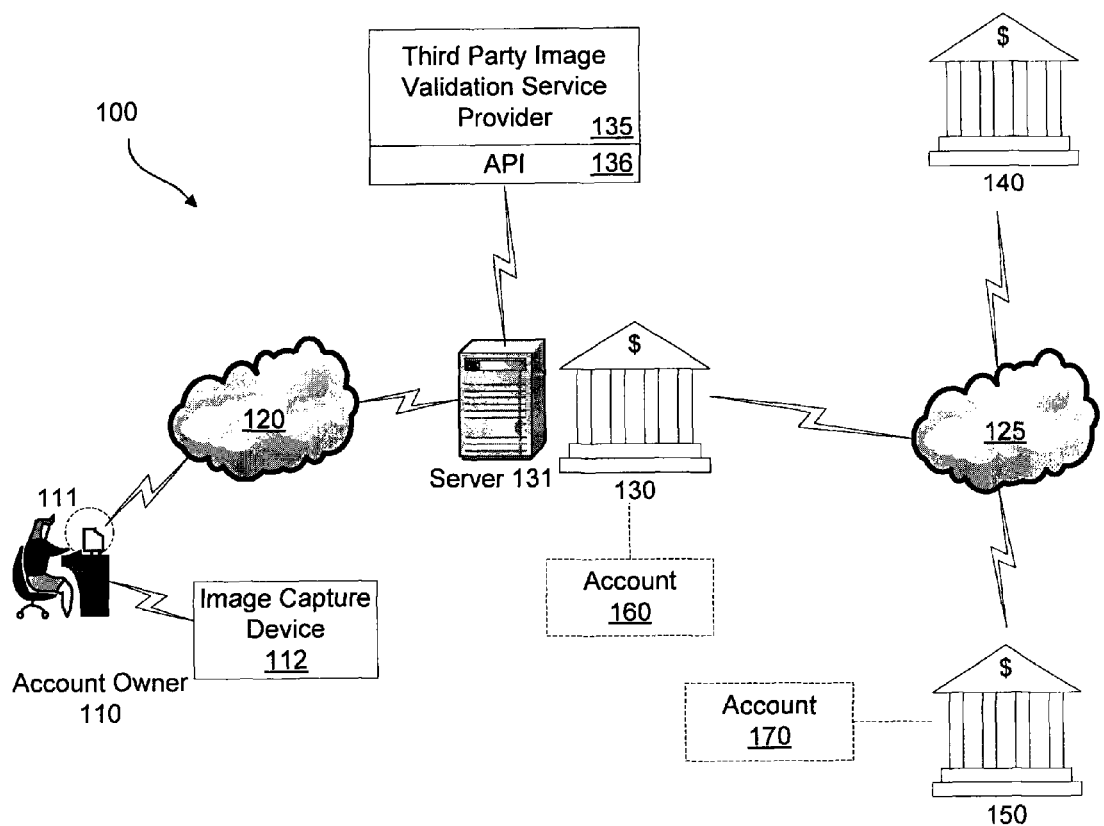
FIG. 1 illustrates a broad view of a system in which the described embodiments may be employed.
Figure 2:
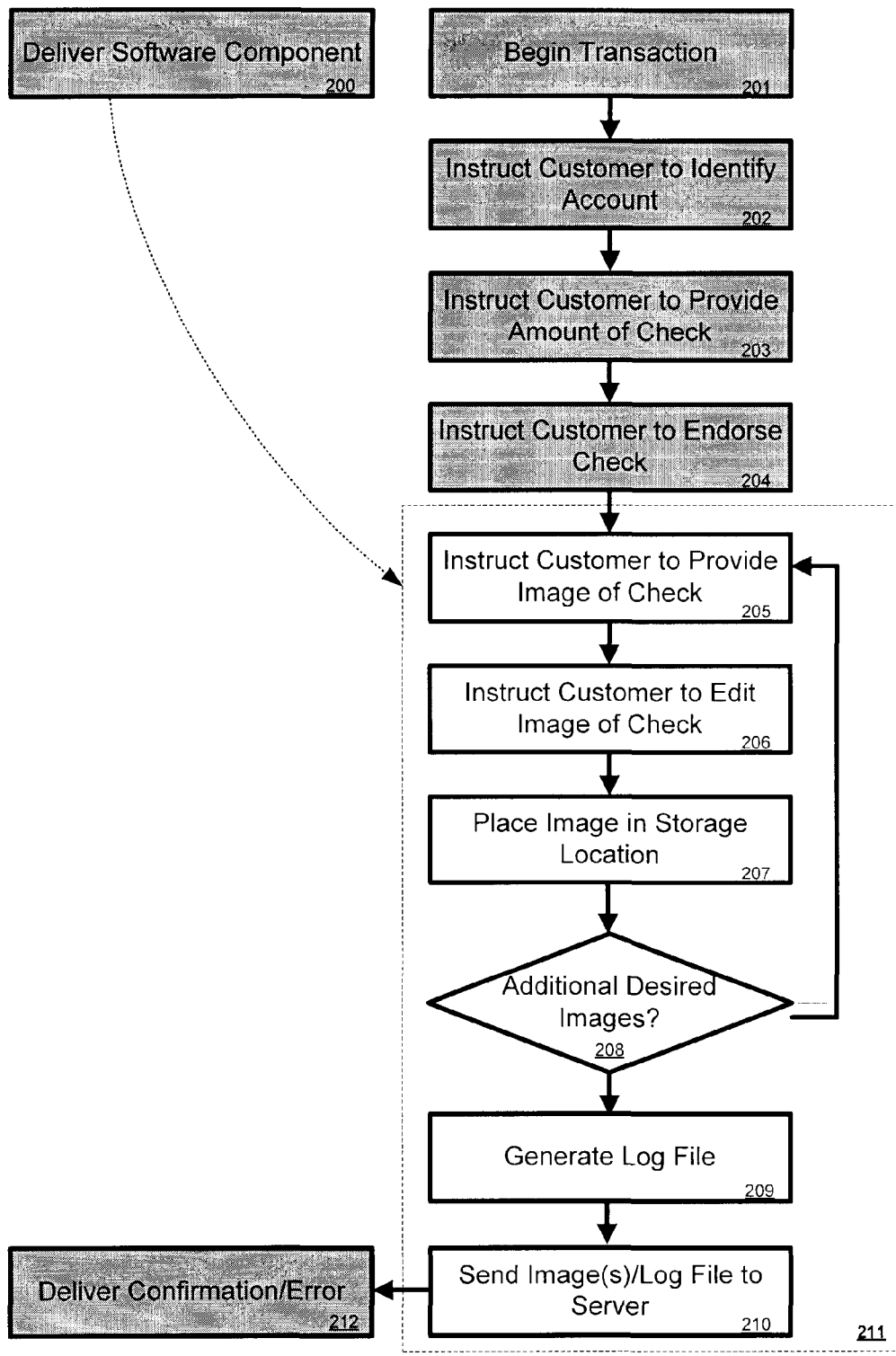
FIG. 2 illustrates a method for facilitating deposit of a check from a customer-controlled general purpose computer.
Figure 3:
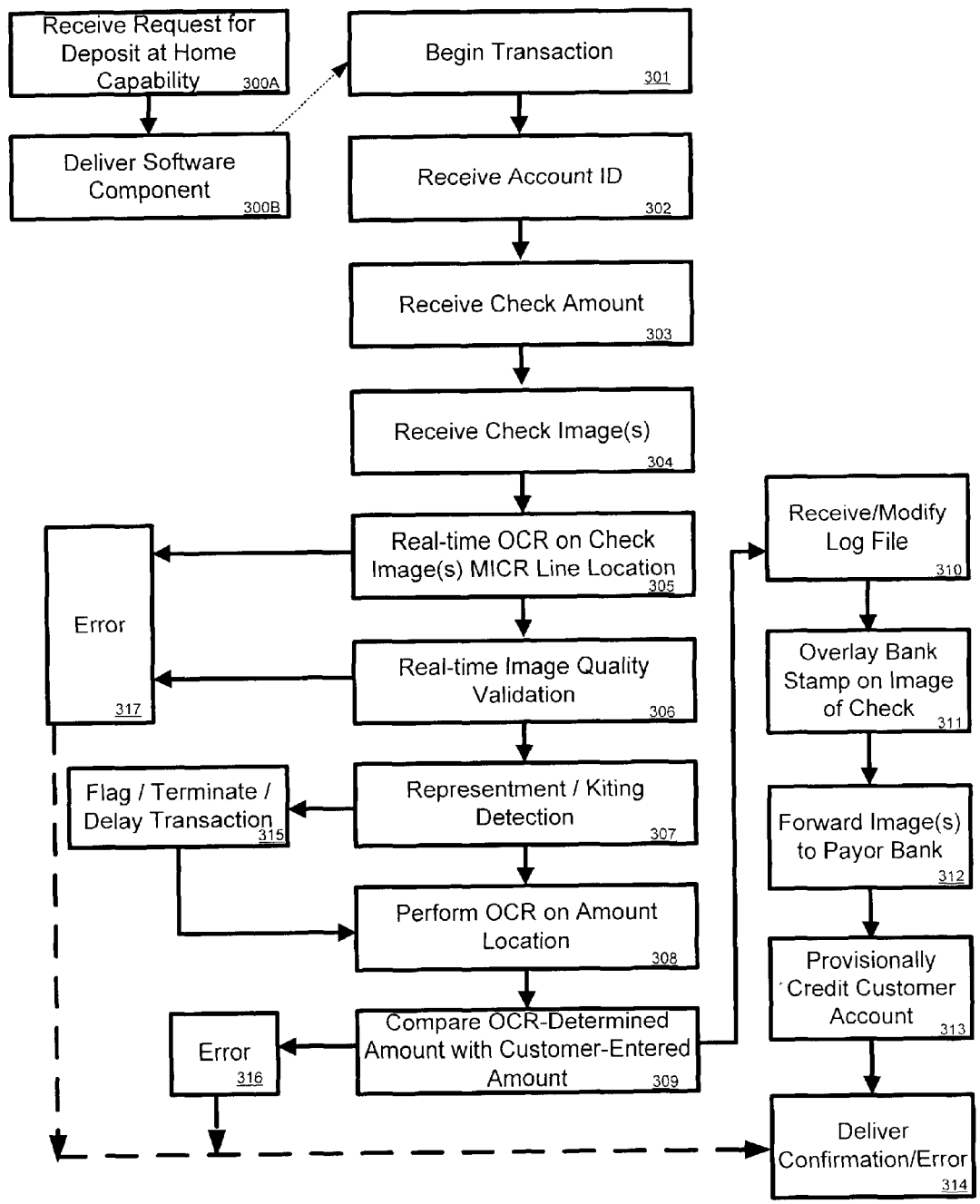
FIG. 3 illustrates a method for processing a check deposit.

FIGS. 1, 2, and 3 are generally directed to a variety of aspects of a system for processing remote deposit of checks as contemplated for use in connection with various embodiments of the invention. FIG. 1 illustrates an example system in which the described embodiments may be employed. System 100 may include account owner 110, e.g., a bank customer who may be located, for example, at the customer's private residence. The account owner 110 may be utilizing a customer-controlled, general purpose computer 111. A general purpose computer 111 is generally a Personal Computer (PC) running one of the well-known WINDOWS® brand operating systems made by MICROSOFT® Corp., or a MACINTOSH® (Mac) brand computer, running any of the APPLE® operating systems. General purpose computers are ubiquitous today and the term should be well understood. A general purpose computer 111 may be in a desktop or laptop configuration, and generally has the ability to run any number of applications that are written for and compatible with the computer's operating system. The term "general purpose computer" specifically excludes specialized equipment as may be purchased by a business or other commercial enterprise, for example, for the specialized purpose of high-speed, high-volume check deposits. A particular advantage of a system as illustrated in FIG. 1 is its ability to operate in conjunction with electronics that today's consumers actually own or can easily acquire, such as a general purpose computer, a scanner, and a digital camera.

General purpose computer 111 may also be "customer-controlled." A common example of a customer-controlled computer would be a typical computer located in a private residence. The owner of such a computer typically has the power to install programs and configure the computer as they wish, subject to certain security restrictions that may be imposed by the hardware or software manufacturers. A customer-controlled computer need not be located in a private residence, however. For example, computers in college dormitories, in workplace offices, and so forth may also be considered "customer-controlled."

An example of a computer that would not be considered customer-controlled would be an Automatic Teller Machine (ATM) that is typically controlled by a bank or other business. Although a customer may access and utilize an ATM machine, the ATM machine is not customer-controlled because the allowed uses of the ATM machine are highly restricted. Relevant factors in determining whether a computer is customer controlled are thus the scope of operations that a customer may perform using the computer, and extent to which the customer can reconfigure the machine in some way by adding software and/or hardware components. In general, any customer ability to add software and/or hardware components is adequate to qualify a computer as customer-controlled.

One of the applications that may run on a general purpose computer 111 in connection with the invention is a browser. Common browsers in use today are, for example, the popular INTERNET EXPLORER® line of browsers made by MICROSOFT® Corp., the FIREFOX® browsers distributed via the MOZILLA® open source project, and the NETSCAPE NAVIGATOR® browsers also distributed via the MOZILLA® open source project. Browsers generally allow users to point to a Uniform Resource Locator (URL), and thereby retrieve information such as a web page. For example, a browser application on computer 111 could retrieve a web page that is kept at server 131, and display the web page to the account owner 110, as is generally known and appreciated in the industry and by the general public.

Another application, or set of applications, that may run on a general purpose computer 111 in connection with the invention comprises "virtual machine" technologies such as the JAVA® virtual machine software distributed by SUN MICROSYSTEMS® Corp, and .NET® Framework distributed by MICROSOFT® Corp. In general, such applications facilitate execution of computer programs in a variety of computing environments. For example, a JAVA® applet is a computer program (which may be alternatively referred to herein as a "software component") that can execute on any computer running the JAVA® virtual machine software. The applet may be provided to virtual machine software in a "source code" format, and may be compiled by a "just in time" compiler, so as to put the applet in a form that can be executed by the hardware associated with the particular computing device. These technologies are known in the art and may be utilized in connection with a system as illustrated in FIG. 1.

An image capture device 112 may be communicatively coupled to the computer 112. Image capture device may be, for example, a scanner or digital camera. Computer 111 may comprise software that allows the user to control certain operations of the image capture device 112 from the computer 111. For example, modern scanner users may be familiar with the TWAIN software often used to control image capture from a computer 111. Similarly, digital cameras often ship with software that allows users to move images from the camera to a computer 111, and may also provide additional functions, such as photo editing functions crop and rotate.

Financial institutions 130, 140 and 150 may be any type of entity capable of processing a transaction involving a negotiable instrument. For example, financial institutions 130, 140 and 150 may be retail banks, investment banks, investment companies, regional branches of the Federal Reserve, clearinghouse banks and/or correspondent banks. A negotiable instrument is usually a type of contract that obligates one party to pay a specified sum of money to another party. By way of example, and not limitation, negotiable instruments may include a check, draft, bill of exchange, promissory note, and the like.

Financial institution 130 is illustrated as associated with a server 131. Financial institution 130 may maintain and operate server 131 for the purposes of communicating with customers such as 110. Alternatively, such server may be maintained and operated by one or more third party vendors who act under the instructions of the financial institution 130, but possess skills and resources that may be more effective in competent operation of electronics. Such arrangements are well known in the industry and in this case the server 131 is nonetheless considered to be "associated" with the financial institution 130.

Furthermore, one or more third parties may provide electronic services to a financial institution. For example, a third party image validation service provider 135 may expose an API 136 to financial institution server 131. By appropriately calling the API 136, the server 131 can cause the third party 135 to perform requested functions and return results. For example, the financial institution may request the third party to inspect check images to determine if they meet specified requirements. Server 131 may then pass images to third party 135, which will automatically perform the requested tasks, and return errors/approvals and the like to the server 131. This arrangement has advantages in that third party 135 may specialize in performing certain operations that financial institution 130 would prefer not to invest in. It will be appreciated that the third party 135 may also expose its API 136 to a network such as 120 and 125, and thereby make it more generally available to other financial institutions 140, 150.

Account owner 110 may be an individual who owns account 160, which may be held at financial institution 130. As such, account owner 110 may be described as a customer of financial institution 130. Account 160 may be any type of account for depositing funds, such as a savings account, checking account, brokerage account, and the like. Account owner 110 may communicate with financial institution 130 by way of communication network 120, which may include an intranet, the Internet, a local area network (LAN), a wide area network (WAN), a public switched telephone network (PSTN), a cellular network, a voice over internet protocol (VoIP) network, and the like. Account owner 110 may communicate with financial institution 130 by phone, email, instant messaging, facsimile, and the like.

In one contemplated embodiment, network 120 is a publicly accessible network such as the Internet, which can presently be accessed from many private residences and many public places such as college campuses, airports, coffee shops, and restaurants throughout the United States as well as many other countries of the world. A variety of technologies are available to establish secure connections over such a public network, so that data transmitted between computer 111 and a server 131 associated with the institution 130 remains either inaccessible or indecipherable by third parties that may intercept such data. The invention may make use of any such security technologies.

Financial institutions 130, 140 and 150 may communicate with each other via a network 125. Network 125 may be a publicly accessed network such as 120. Alternatively, network 125 may have certain characteristics that differ from network 120, due to the different requirements of bank-to-bank communications. For example, one might envision certain security features and access restrictions being more important in bank-to-bank communications.

In an embodiment, account owner 110 may wish to deposit a check that is drawn from payor account 170 at financial institution 150. Account owner 110 may deposit the check into customer account 160 by converting the check into electronic data, e.g., a digital image, and sending the data to financial institution 130. Various embodiments of the invention described herein may be carried out by financial institution 130 electronics such as server 131 upon receipt of a check image from computer 111. However, those of skill in computing and software technologies will appreciate that functionality can be distributed across a variety of devices and therefore some of the method steps, subsystems, and computer readable media associated with the invention may in some embodiments be located outside of the range of what would be considered financial institution 130 electronics, e.g., might be located at computer 111, elsewhere in the networks 120 and 125, or at third party electronics 135.

Account owner 110 may convert the check into a digital image by scanning the front and/or back of the check using image capture device 112. Account owner 110 may then send the image to financial institution 130. Sending the image may be referred to as "presenting" the check. Upon receipt of the image, financial institution server 131 may conduct a variety of automated operations to establish authenticity and quality of the received image, communicate with the customer, initiate a check clearing operation, and credit the customer's account. One aspect of the invention described in greater detail below comprises operations for establishing check image quality and authenticity in real-time, i.e. with sufficient speed to allow communication of results to a depositing customer during a same on-line session.

Financial institution 130 may credit the funds to account 160 in a "soft post" operation. In a soft post operation, the funds appear to be available for use by a customer, and may in fact be available for use, but at least some indication is retained to note that the funds have not actually been received from the payor bank. When the funds are received from the payor bank, the "soft post" is converted to a "hard post" and the indication is removed, along with any further restriction on the use of the funds. Financial institution 130 may clear the check by presenting the digital image to an intermediary bank, such as a regional branch of the Federal Reserve, a correspondent bank and/or a clearinghouse bank.

For example, the check may be cleared by presenting the digital image to financial institution 140, which may be a regional branch of the Federal Reserve, along with a request for payment. Financial institution 130 and 150 may have accounts at the regional branch of the Federal Reserve 140. As will be discussed in greater detail below, financial institution 130 may create a substitute check by converting an image provided by account owner 110 into a second format, and may present the substitute check to financial institution 140 for further processing. Upon receiving the substitute check, financial institution 140 may identify financial institution 150 as the paying bank (e.g., the bank from which the check is drawn). This may be accomplished using a nine-digit routing number located on the bottom left hand corner of the check. A unique routing number is typically assigned to every financial institution in the United States. Financial institution 140 may present the substitute check to financial institution 150 and request that the check be paid. If financial institution 150 verifies the check (i.e., agrees to honor the check), financial institution 140 may then settle the check by debiting funds from financial institution 150 and crediting funds to financial institution 130. Financial institution 150 may then debit funds from account 170.

It will be appreciated that the preceding examples are for purposes of illustration and explanation only, and that an embodiment is not limited to such examples. For example, financial institution 150 may be a correspondent bank (i.e., engaged in a partnership with financial institution 130). Thus, financial institution 130 may bypass the regional branch of the Federal Reserve and clear the check directly with financial institution 150. In addition, account 160 and account 170 may both be held at financial institution 130, in which case the check may be cleared internally.

FIG. 2 illustrates a method for facilitating deposit of a check from a customer-controlled general purpose computer. The various steps of FIG. 2 may be viewed as performed by a server computer associated with a financial institution, in conjunction with a software component that operates from a customer-controlled general purpose computer. Various of the steps are contemplated as performed by the server, while various other steps are contemplated as performed by the software component.

In the embodiment illustrated in FIG. 2, the darker boxes indicate steps that are performed by the server, for example by delivering information to the user through the user's browser application. Making information available on a server to customers with a browser is considered to be effectively "delivering" such information for the purposes of this document. The lighter boxes inside 211 indicate steps that are performed by the software component as it executes on the customer computer. Those of skill will recognize that alternative configurations are readily achievable by moving functions from server to software component or vice-versa.

The server may first deliver a software component to the customer-controlled general purpose computer 200. This may be done in response to a customer request for the capability of making deposits from his computer. In one embodiment, the financial institution may provide such capability only to customers that meet predetermined criteria of trustworthiness. For example, it can be required that the customer's accounts are in good standing, that the customer relationship has lasted a predetermined amount of time, that the customer has a predetermined number of financial service products with the financial institution (e.g. bank accounts, mortgages, insurance policies, etc.), that the customer has a predetermined level of assets with the financial institution, and so forth.

The software component may be configured to facilitate the deposit transaction. In one embodiment, the software component may be compatible with the JAVA® or .NET® technologies described above. Such configurations allow for widespread dissemination and successful operation in a wide variety of computing environments as may exist on customer-controlled general purpose computers.

Where the software component is written for JAVA®, .NET®, or any other such technology, it is useful in step 200 to first determine whether the customer-controlled general purpose computer has an appropriate virtual machine application installed, e.g. JAVA® Virtual Machine (JVM) or .NET® framework. If the computer does not have the appropriate application installed, such application may be automatically installed, or the customer may be directed to a location from which such application may be downloaded and installed. The software component may then be delivered 200, and should work as intended. The various other steps of FIG. 2 may now take place, or may take place at some subsequent time using the software component as previously downloaded.

After downloading or otherwise accepting the software component, and assuming the customer has an appropriate image capture device, the customer now has the capability to make deposits from his general purpose computer. For example, the customer points his browser to a bank website, where a link may be available that causes the bank server to initiate a deposit transaction 201. The customer may be asked to log in using a user name and password.

The customer may next be instructed to identify an account into which the deposit will be made 202. This can be done, for example, by providing a webpage that lists the available accounts, along with an instruction to select an account. Alternatively, a box may be provided into which the customer may type an account number, along with an appropriate instruction to type the number of the desired account. The account may be any account, and need not necessarily be the customer's own account, although it is contemplated that a large number of customer deposits may be made into the transacting customer's account, and embodiments may find it useful to restrict the allowed accounts to the customer's own accounts. In such embodiments, if the customer has just one account with the financial institution, step 202 may be eliminated because the only available allowed account would be the customer's single account.

The customer may next be instructed to identify an amount of a check or other negotiable instrument he wishes to deposit into the selected account 203. In one embodiment, this can be done similarly to step 202 by providing a webpage with a box into which the customer may type an amount, along with an appropriate instruction to type the amount of the check. The customer may also be instructed to endorse the check 204, e.g., by signing his or her name on the back of the check.

The customer may next be instructed to provide an image of a front side of a check 205, for example, by using an image capture device. In one embodiment, the customer may be instructed to place the check face down on a flatbed scanner, and may further be instructed as to the location and orientation of the check on the scanner. If the customer is instructed to take a digital photograph of the check using a digital camera, the customer may be instructed as to the position and orientation of the check, lighting, angle of camera, distance and focal length (zoom) of camera, and so forth. The software component may be useful at this point in providing a graphical illustration of just how the customer should provide the image. The customer may further be given instructions as to how to activate the image capture device and/or move the image from the device to the general purpose computer.

In one embodiment, it is contemplated that the software component allows for control of the transaction and transaction data throughout the various aspects thereof. For example, the software component may open a folder in a storage location, such as the hard drive of the general-purpose computer, and may work in conjunction with any software that interfaces with the image capture device to deposit the image in such folder. This may advantageously be conducted in a secure manner to prevent any unwanted image diversion or tampering. The hard drive of the general-purpose computer is considered to be a storage location that is controlled by said customer-controlled general purpose computer, but other storage locations such as disk drives, networked drives, and so forth may also be effectively controlled by the general purpose computer.

The software component may itself perform operations such as opening a folder and placing the images therein, or may effectively achieve such operations by instructing the customer and/or other applications to do so. All software operates to some extent under the control and with the support of an operating system running on the general purpose computer, and such support is of course appropriate in embodiments of the invention.

The software component may next cause the image of the check to be presented to the customer for editing, e.g. by asking the customer to crop and/or rotate the check image to a predetermined orientation 206. In embodiments using a scanner, an image of the entire scanner bed, or some otherwise too large image may be generated. If the check was placed in the top left corner of the scanner bed, the customer may be asked to indicate the bottom right corner of the check image, and the image may be cropped to contain only the check image, thereby removing a portion of the originally obtained image.

An appropriately edited image of the check may be placed in the storage location 207. If further images are necessary 208, steps 205-207 may be repeated as necessary. For example, the customer may be instructed to endorse and provide an image of the back side of a check. To ensure the check is appropriately voided, the customer may be asked to write "void" on the check and re-scan the front of the check.

A log file may be generated 209 to collect data for processing or troubleshooting the deposit transaction. The log file may be placed in the storage location along with the various images of the check.

Once the desired images are collected and edited, they may be delivered to the server for processing the deposit 210. The log file may also be delivered at this time. Once such files are delivered, they may be deleted from the customer's general purpose computer. If the server determines that the delivered images and any corresponding data are sufficient to go forward with the deposit, the customer's account may be provisionally credited with a soft post, and a confirmation page may be delivered to the customer via the customer's browser application 212. The customer may be instructed to destroy, e.g. by shredding, the actual physical check or other negotiable instrument. Under the current check handling procedures in the United States, the physical check is not necessary in processing a deposit, nor is it necessary to keep the original check in bank or customer records.

FIG. 3 illustrates a method for processing a check deposit. The method of FIG. 3 is designed to complement that of FIG. 2 and to illustrate exemplary steps that may be carried out by a server or other electronics operated by a financial institution before, during, and after the various steps of FIG. 2 are carried out.

In general, as illustrated in FIG. 3, such server may receive a request for deposit at home capability 300A, and in response to such request may deliver a software component to the requesting customer 300B. As with FIG. 2, intermediate steps may comprise determining if the customer is in fact eligible for a remote deposit program, and ensuring the customer has an appropriate virtual machine environment installed on their general purpose computer—in embodiments where the software component requires such an environment.

A transaction may be initiated 301 upon receiving a customer indication that a deposit transaction is desired. The customer is instructed to identify an account per FIG. 2, and as a result the financial institution electronics receive an account identifier (ID) 302. Similarly, financial institution electronics receive check amount 303. At this juncture the software component handles image capture processes, which may or may not involve the server until such time as check image(s) are received 304.

Upon receipt of check images, an Optical Character Recognition (OCR) process may be invoked to determine certain information about the check. For example, OCR may be performed on the check's MICR line location 305 to determine information such as payor bank routing number, account number, and check number. In one embodiment, multiple attempts may be made to read a check MICR line as described further below. Once the MICR line is established, the bank routing number may then be validated against a list of valid routing numbers to ensure that it corresponds to a legitimate bank, and in some embodiments, to ensure it corresponds to a United States bank. In one embodiment, the OCR is conducted in real time, i.e. during a same on-line session in which the customer initiated the deposit, so as to validate some initial deposit information immediately, and provide a customer with an on-the-spot error or approval of the transaction.

In one embodiment, additional OCR operations may be performed, such as upon other aspects of the front side of the check (drafter's name, amount, etc.) and upon an image of a back side of a check. One problem that occurs involves customer submission of two front images, instead of one front image and one back image. OCR may be performed on a MICR line location of an alleged image of a back side of said check to confirm that said alleged image of a back side of said check does not bear a MICR line. If no MICR line is present in such location then it is more likely that the alleged image of a back side of said check is in fact the back, and not the front, of the check.

Another advantageous use of OCR is on the endorsement location on the back of a check. By performing OCR, it may be possible in some embodiments to determine that the signature matches that of the payor or drafter of the check. However, often signatures are illegible. Thus in one embodiment it is advantageous to determine that some mark or signature is present in the endorsement location on the back of the check, without conducting any further signature identification procedures.

If the routing number determined using OCR cannot be validated, an error may result 317, and the deposit transaction can be aborted. An error message can be delivered to the customer 314, explaining a reason that the transaction could not be processed.

Real-time validation of check image quality may also be performed 306. In this step, bank electronics may automatically convert the received digital image into a format that will be used for presenting the check, such as TIFF. The TIFF image may then be analyzed to ensure it meets any of a variety of requirements. This analysis may be performed by the financial institution's own electronics, or may be outsourced to a third party as discussed with element 135 in FIG. 1. If the image in a second format meets all requirements, the process continues, and may lead to ultimate approval delivery 314. If the image in a second format does not meet requirements, an error 317 may be sent to the customer, or the image may be repaired and validation may be re-attempted. Further description of this aspect is provided below.

Representment and kiting detection processes may be carried out to determine whether the check was previously deposited or is suspected to be part of a kiting operation 307.

There are numerous possibilities for false positives in representment and kiting detection 307. Because of this, it is advantageous in some embodiments to proceed with a deposit transaction regardless of the fact that a representment may be initially identified in 307. As illustrated in FIG. 3, if a representment or kiting operation is detected in 307, the transaction may be either flagged for further scrutiny at a later time, delayed, or terminated 315. If the transaction is flagged, it will be allowed to proceed through the various other steps and result in a soft post 313 to the customer account. If it is delayed or terminated, the soft post 313 will be made only after further scrutiny of the transaction, or will be avoided entirely. If a representment or kiting indicator is not detected, the transaction need not be flagged, delayed, or terminated, and step 315 is unnecessary.

OCR may further be performed on a check amount location 306, and the amount as determined using OCR may be compared against the customer-entered amount received pursuant to step 303. If the amounts do not match, an error 316 can result, terminating the transaction and delivering appropriate information concerning the error to the customer 314. OCR may further be performed on any other aspects of the check image at this time if it is advantageous in specific embodiments to do so.

The server may further receive and modify a deposit transaction log file 310. Alternative versions of the images received may be generated an placed in the log file. Check 21 regulations require a bi-tonal TIFF formatted image, which is generally a low-quality image format as compared to other available image formats. Therefore, it is desirable in some embodiments to retain both a "good" image in an initial format, e.g., in a JPEG format, as well as the modified bi-tonal TIFF required by Check 21. This way, if any troubleshooting is necessary, a good image of the check remains available.

In some embodiments, a bank stamp may be overlaid on the image of the back of the check 311, just as if the check was physically deposited at a bank. Appropriate images may be forwarded to the payor bank for payment 312, and meanwhile, the customer's account may be provisionally credited in the amount of the check 313. A confirmation can be delivered to the customer 314.

At 312, in one embodiment, the bank may forward an image or images to a payor bank. Provisionally crediting the customer account 513 with a "soft post" and delivering a confirmation to the customer-controlled general purpose computer 514 may be done before, after, or contemporaneously with step 312.

In one embodiment, forwarding an image or images to a payor bank 512 may be performed pursuant to an Automated Clearinghouse (ACH) transaction. ACH transactions typically include payment instructions to debit and/or credit an account. Banks often employ ACH service providers to settle ACH transactions. Examples of ACH service providers include regional branches of the Federal Reserve and the Electronic Payments Network (EPN).

In an ACH transaction, the payee's (customer's) bank may be referred to as the originating depository financial institution (ODFI). Upon receipt of appropriate check information, the payee's bank may credit funds to the payee's account and generate an ACH debit entry to the payor's account, which may be presented to the ACH service provider for processing.

The ACH service provider may process the debit entry by identifying the account and bank from which the check is drawn. The bank from which the check is drawn (i.e., the payor's bank) may be referred to as a receiving depository financial institution (RDFI). If the payor's bank verifies the transaction, the ACH service provider may settle the transaction by debiting the payor's bank and crediting the payee's bank. The payor's bank may then debit the payor's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

The bank may process the ACH debit entry, substitute check, and/or electronic image. As noted above, the bank may present the ACH debit entry to an ACH service provider (e.g., EPN), which may be responsible for settling the transaction between the payee's bank and the payor's bank. The bank also may convert the digital image into a substitute check and present the substitute check to an intermediary bank (e.g., a regional branch of the Federal Reserve) to complete the check clearing process. If the payor's bank and the payee's bank are the same, the transaction can be handled internally at the payor bank by simply debiting the account of one customer and crediting the account of another. Thus, an intermediate step may comprise identifying if the payor bank and the payee bank are one and the same, or otherwise operating in a closely cooperative manner.

Figure 4:
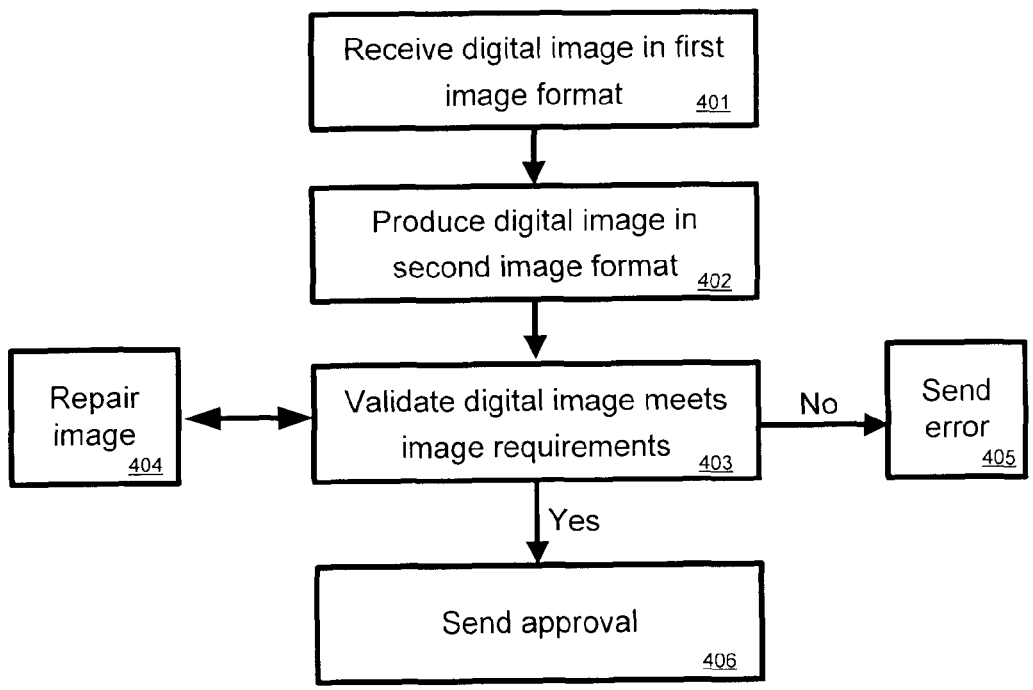
FIG. 4 illustrates a generalized process for real-time validation of check image quality.
Figure 5:
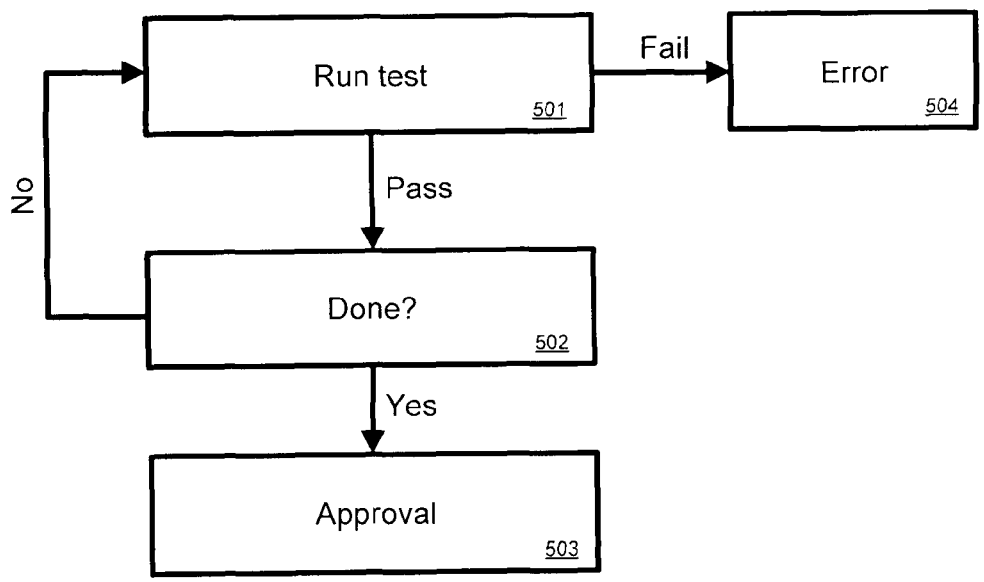
FIG. 5 illustrates an exemplary process for performing a real-time validation step in a method such as the method of FIG. 4.
Figure 6:
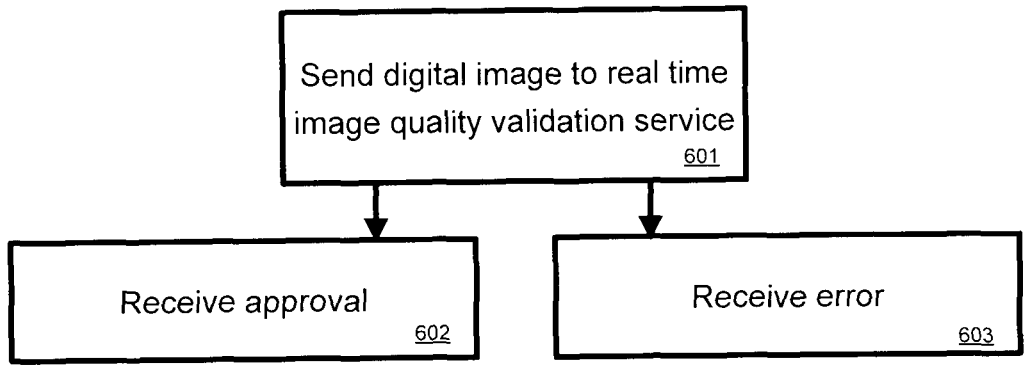
FIG. 6 illustrates an alternative embodiment for performing a real-time validation step in which check image validation is outsourced to a third party.

Each of FIGS. 4, 5, and 6 provide exemplary methods for real-time validation of a check MICR line and/or check image quality as may be carried out in a system comprising features as disclosed in FIGS. 1, 2, and 3, and in particular as part of steps 305 and 306 in FIG. 3. However, it should be emphasized that while the various aspects of FIGS. 1, 2, and 3 provide useful context for FIGS. 4, 5, and 6, the disclosed aspects of FIGS. 1, 2, and 3 are in no way required to carry out the steps of FIGS. 4, 5, and 6.

Furthermore, while FIGS. 4, 5, and 6 are illustrated and discussed as methods, it will be acknowledged that they also disclose corresponding systems and computer readable media designed to carry out such methods. FIGS. 4, 5, and 6 may be carried out by electronic subsystems within financial institution electronics such as server 131, which may comprise a variety of other electronics such as routers, switches, and modems. The steps of FIGS. 4, 5, and 6 may also be recorded as instructions on computer readable media designed for causing financial institution electronics to carry out the disclosed methods.

Referring now to FIG. 4, in one embodiment, a method is provided for validating that a digital image of a check can be used in a deposit transaction. A digital image of a check in a first image format, such as the Joint Photographic Experts Group (JPEG) format, is received 401 from a customer computer by financial institution electronics.

Upon receiving the image, a series of automated steps may be triggered. The financial institution may produce a digital image of said check in a second image format 402, for example the Tag Image File Format (TIFF) that is presently required by Check 21 legislation for inter-bank image transfer purposes. Next, the financial institution may validate, in real time, that the digital image meets at least one image requirement 403, such as a requirement that the image is properly formatted, bitonal, has appropriate pixel density, is appropriately sized, of appropriate clarity, and the like. This may be done by the financial institution itself or outsourced to a $3^{rd}$ party service provider that exposes an appropriate Application Programming Interface (API).

If the image meets the requirements, the financial institution electronically communicates an approval 404 of the deposit transaction to the customer computer. If an image repair is necessary, it can be performed by 404. If no repair is possible, and the image does not meet requirements, an error may be sent to the customer 405.

FIG. 5 illustrates an exemplary process for performing a real-time validation step 403 in a method such as the method of FIG. 4. A goal of a process such as FIG. 5 is to establish that a check image meets one or more requirements. To this end, a plurality of tests may be available, each test comprising computer software or hardware configured to analyze a digital image and determine whether it meets a requirement. A test 501 may fail, in which case an error 504 can be thrown. The error 504 may indicate the failed test. A test 501 may also pass, in which case a determination can be made regarding whether additional tests must be applied 502. If so, a next test is run 501. If not, an approval is generated 503.

One requirement presently imposed by Check 21 legislation is that images must be bitonal. A first test 501 may thus ensure that a check image is bitonal. Such a test may, in one embodiment, analyze the information in an image file to ensure that the file does not contain grayscale or color data. Additional tests may be performed in similar fashion to determine whether the image is properly formatted (present embodiments require TIFF), has appropriate pixel density, is appropriately sized, and of appropriate clarity.

FIG. 6 illustrates an alternative embodiment for performing a real-time validation step in which check image validation is outsourced to a third party. In FIG. 6, validating comprises sending the digital image of a check in a second image format to a third party real time image quality validation service 601. This may be accomplished, for example, by calling an API for a web-enabled application exposed by third party electronics. A function call generated by financial institution electronics may indicate a storage location associated with financial institution electronics and comprising the image to be validated, so the image does not have to be sent across a network. Instead, it can be operated upon by third party agent software located executed by financial institution servers. This approach reduces security concerns.

Alternatively, a call to the third party API may include the image to be validated, thereby sending the image to the third party electronics. Third party electronics may specialize in performing validation, for example, by performing a series of tests as described in connection with FIG. 5. Utilizing a third party service in this manner allows for increased specialization and concomitant optimization of image requirements and testing operations.

The third party may supply the financial institution with either an approval 602, or an error 603. When approval is received 602, the financial institution may relay the approval to the customer in real-time. An error may, in one embodiment, also be relayed in real-time to the customer. In preferred embodiments, however, repair operations may be attempted prior to delivering the error. To this end, the third party may itself attempt a repair, or may supply the financial institution with an error code to facilitate repair by said financial institution.

Figure 7:
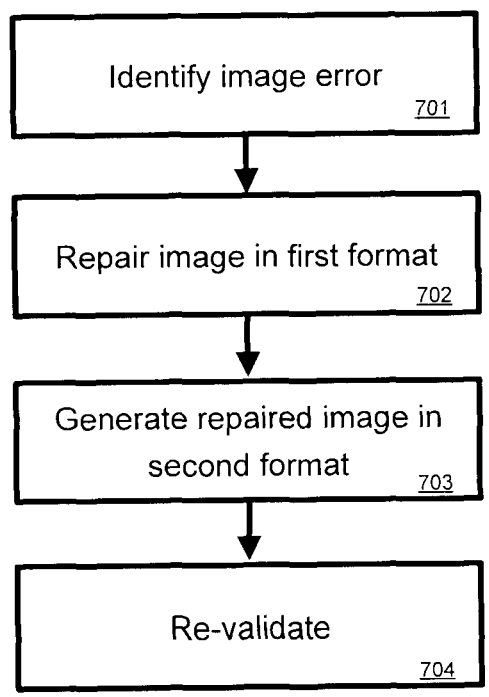
FIG. 7 illustrates an exemplary process for real-time repairing and re-validating a check image.

FIG. 7 illustrates repair processing. In general, repair processing may comprise the following steps: an image error is identified during validation processing 701. Error identification may comprise a part of local image validation processing, or receiving an error code from a third party real-time image quality validation service. In one embodiment, the error code corresponds to an image requirement that the analyzed image did not meet. In another embodiment, it identifies a specific and addressable error in the analyzed image. Financial institution electronics may then utilize the error code to determine a repair operation, and perform the repair for example by passing a check image along with the error code to an error processing computer program loaded onto financial institution electronics.

Repairing the digital image of a check in a second image format is accomplished, in one embodiment, by first repairing the digital image of a check in a first image format 702, e.g. repairing a JPEG image received from the customer computer. A repaired image in said first image format is thereby produced. Returning to the first format (JPEG) image in this manner facilitates repair because the JPEG image is higher quality than the second format (TIFF) image, and repairs are easier and more accurate when additional digital image data is present.

Once the repaired image in a first format is available, a repaired image in the second image format is produced 703. In one embodiment, this is accomplished by converting the repaired image in a first format into a repaired image in a second format. Said repaired image in said second image format may now be re-validated 704 locally, or sent to said real time image quality validation service, in similar fashion as before. An approval is then received indicating said repaired image in said second image format meets applicable image requirements. Alternatively, if the repaired image again fails to meet all requirements, another error may instead be received. Another repair may be attempted if sufficient time remains without degrading customer experience.

As an example of the above, consider a customer attempt to deposit a check with a torn corner. The customer scans the check and produces a JPEG image. The JPEG is sent to the financial institution. The financial institution then generates a bi-tonal TIFF, and validates the TIFF, either locally or using a third party service. An error is identified. The error may identify, for example, a torn upper left corner. In response, a repair process performs an automated upper left corner repair process on the original JPEG. For example, image data may be copied from the upper right corner, rotated 90 degrees, and pasted onto the upper left corner of the image. The repaired JPEG is then converted into a repaired bitonal TIFF, and the repaired TIFF is again validated. All of the above occurs in real-time, i.e. while the customer is waiting for approval of the transaction or error.

Figure 8:
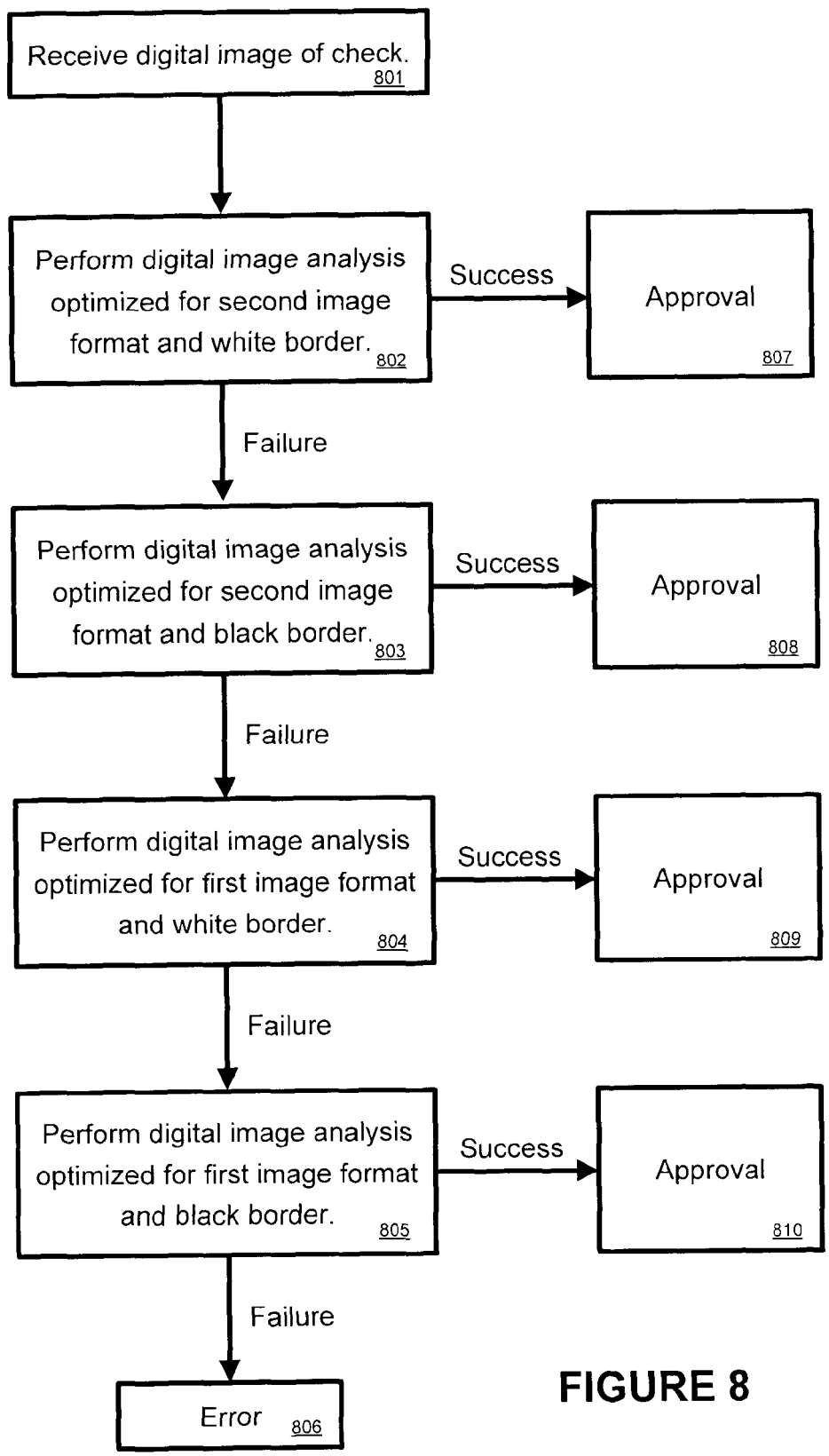
FIG. 8 illustrates an exemplary process for making a plurality of sequential attempts to read a check MICR line in real time, the attempts arranged in a sequence for maximizing speed and accuracy.

In another embodiment, as illustrated in FIG. 8, a sequence of attempts to recognize a check MICR line are performed in real time, the sequence being optimized for greatest speed in the majority of instances, while generating as few failures as practical. FIG. 8 thus provides a more detailed illustration of an embodiment of step 305 in FIG. 3.

A digital image of a check is received from a customer computer 801, as explained above. The image may be received in a first format, e.g., JPEG, and an image in a second format, e.g., TIFF, may be produced.

We note that OCR processing of a MICR line in a digital image can be frustrated by several factors. First, OCR processing is faster, but more error prone, on a low quality TIFF image than on a high-quality JPEG. Second, OCR processing can be optimized for white border images or for black border images.

Thus, the process illustrated in FIG. 8 is optimized for speed of OCR processing of a MICR line, so that such processing is adapted for real-time use. A first MICR read attempt includes digital image analysis that is optimized for a digital image in a second image format, e.g., TIFF, and comprising a white border 802. If the first attempt is a success, an approval is generated 807 and the illustrated process ends.

If the first attempt fails, a second MICR read attempt may be performed which includes digital image analysis that is optimized for a digital image in said second image format, e.g., TIFF, and comprising a black border 803. If the second attempt is a success, an approval is generated 808 and the illustrated process ends.

If the second attempt fails, a third MICR read attempt may be performed which includes digital image analysis that is optimized for a digital image in a first image format, e.g., JPEG, and comprising a white border 804. If the third attempt is a success, an approval is generated 809 and the illustrated process ends.

If the third attempt fails, a fourth MICR read attempt may be performed which includes digital image analysis that is optimized for a digital image in said first image format, e.g., JPEG, and comprising a black border 805. If the fourth attempt is a success, an approval is generated 809 and the illustrated process ends. Otherwise, an error may be sent 806 to the customer when all attempts fail.

As with image quality validation discussed above, the processes of FIG. 8 may be performed by financial institution electronics or by a third party who exposes an API to the financial institution. Where the third party API is utilized, the steps of FIG. 8 may further comprise electronically communicating an approval of said digital image to financial institution computers. In either embodiment, electronically receiving the original check image and electronically communicating an approval to the customer are performed during a same online customer session with the financial institution.

Figure 9:
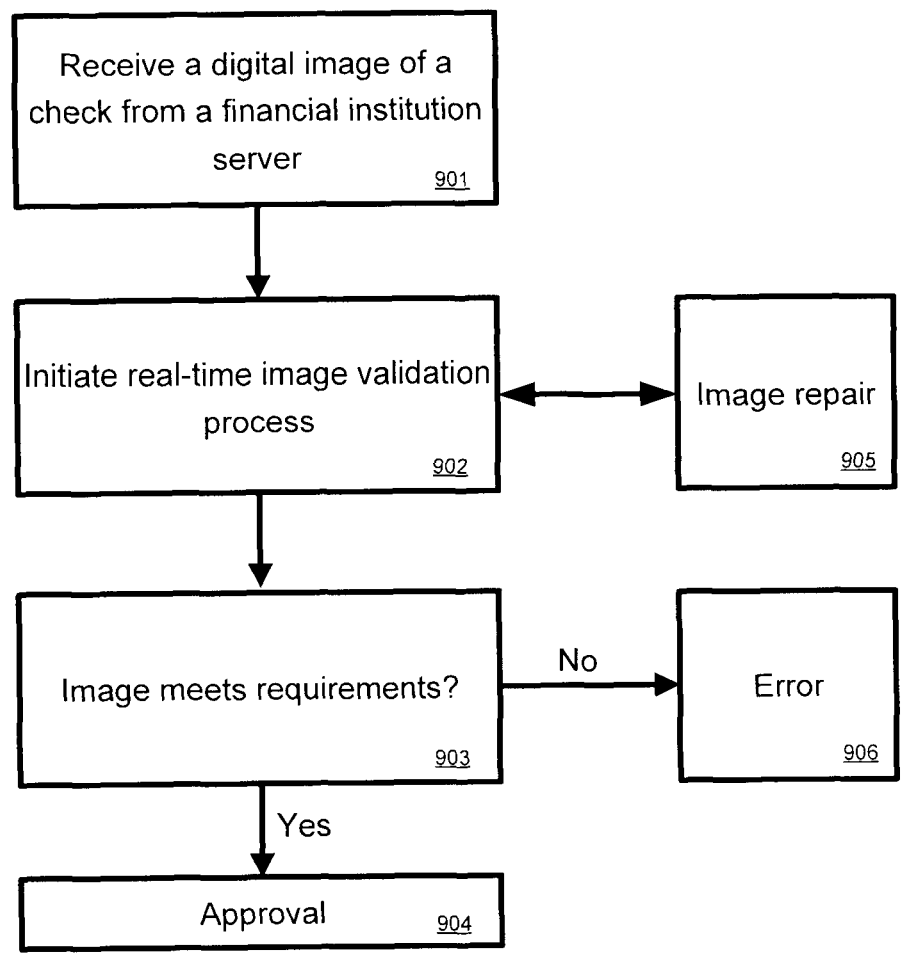
FIG. 9 illustrates a real-time validation process that may be performed by a third party that provides a check validation service to one or more financial institutions.

FIG. 9 illustrates an embodiment in which a $3^{rd}$ party service is provided for validating check image quality. The third party may receive a digital image of a check from a financial institution server 901, for example a server that calls a $3^{rd}$ party API as described in the embodiment of FIG. 4 above.

In response to said receiving, the $3^{rd}$ party may automatically initiate a real-time image validation process 902 to ensure said digital image of a check meets an image requirement. Repair processing may be conducted 905 if necessary. Once an image meets all requirements 903, an approval 904 is returned, in real-time, to the calling financial institution. An error is sent 906 if the image does not meet all pertinent requirements.

In connection with performing the process of FIG. 9 in real-time, it can be said that receiving 901, automatically initiating 902, and sending approval 904 are performed during a first time interval. Said first time interval is contained within a second time interval, i.e. it starts after the start of said second time interval and ends before the end of the second time interval. Said second time interval corresponds to an online customer session comprising communications between the financial institution server and a customer computer. This is more formal way of stating that the processing occurs during a same customer on-line session in which the customer initiated the deposit transaction.

The various techniques described herein may be implemented with hardware or software or, where appropriate, with a combination of both. Thus, the methods and apparatus of the disclosed embodiments, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the disclosed embodiments. In the case of program code execution on programmable computers, the computer will generally include a processor, a storage medium readable by the processor (including volatile and non-volatile memory and/or storage elements), at least one input device and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The described methods and apparatus may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the processing of the disclosed embodiments.

In addition to the specific implementations explicitly set forth herein, other aspects and implementations will be apparent to those skilled in the art from consideration of the specification disclosed herein. It is intended that the specification and illustrated implementations be considered as examples only, with a true scope and spirit of the following claims.

What is claimed:

1. A processor-implemented method for validating that a digital image of a physical check can be used in a deposit transaction before approval of the deposit transaction, comprising:
   receiving via a processor, a digital image of a physical check from a financial institution server; and
   in response to said receiving, the processor, during a first time interval:
      initiating an image validation process to ensure determine whether said digital image of the physical check meets an image requirement;
      sending an approval to said financial institution server when said digital image of the physical check meets said image requirement; and
      repairing said digital image of said physical check by resolving an error with respect to said digital image when said digital image does not meet said image requirement;
   wherein said first time interval is contained within a second time interval, said second time interval corresponding to an online customer session comprising communications between said financial institution server and a customer computer.

2. The method of claim 1, wherein said digital image of a check is in a Tag Image File Format (TIFF) format.

3. The method of claim 1, wherein said digital image of said physical check is initially in a first format, and further comprising converting said digital image of said physical check into a second format, wherein image validation is performed on said second format of said digital image.

4. The method of claim 3, wherein said first format comprises a Joint Photographic Experts Group (JPEG) format, and wherein said second format comprises a Tag Image File Format (TIFF) format.

5. The method of claim 3, further comprising, during the first time interval:
   converting said repaired digital image to said second format;

re-validating said repaired digital image in said second format; and sending an approval or an error to said financial institution server based on said re-validation.

6. The method of claim 1, further comprising notifying said financial institution server of the error when repairing does not resolve the error.

7. The method of claim 1, wherein said image requirement comprises one or more of a TIFF format requirement, a bitonal requirement, a pixel density requirement, a size requirement, an intact corner requirement, and a clarity requirement.

8. A system for validating that a digital image of a check can be used in a deposit transaction before approval of the deposit transaction, comprising:

a memory; and a processor disposed in communication with said memory, and configured to execute a plurality of processing instructions stored in the memory, wherein the processor executes instructions to, during a first time interval:

receive and store in the memory a digital image of a physical check from a financial institution server;

initiate, in response to said receiving, an image validation process to determine whether said digital image of the physical check meets an image requirement;

determine whether a repair of the digital image of said physical check causes the digital image to meet the image requirement;

send an approval to said financial institution server when the repair causes said digital image of the physical check to meet said image requirement;

wherein said first time interval is contained within a second time interval, said second time interval corresponding to an online customer session comprising communications between said financial institution server and a customer computer.

9. The system of claim 8, wherein said digital image of a check is in a Tag Image File Format (TIFF) format.

10. The system of claim 8, wherein said digital image is received in a first format, wherein said first format comprises a Joint Photographic Experts Group (JPEG) format, and wherein said second format comprises a Tag Image File Format (TIFF) format, further comprising:

a subsystem executable by the processor to convert said digital image from said first format into said second format, wherein image validation is performed on said second format of said image.

11. The system of claim 8, wherein the processor further executes instructions to repair said digital image of said physical check by resolving an error with respect to said digital image when said digital image does not meet said image requirement.

12. The system of claim 11, wherein the processor further executes instructions to, during the first time interval:

re-validate said repaired digital image; and send an approval or an error to said financial institution server based on said re-validation.

13. The system of claim 8, wherein the processor further executes instructions to notify the financial institution server of an error when no repair causes the digital image to meet the image requirement.

14. The system of claim 8, wherein said image requirement comprises one or more of a TIFF format requirement, a bitonal requirement, a pixel density requirement, a size requirement, an intact corner requirement, and a clarity requirement.

15. A computer readable non-transitory medium having stored instructions for validating that a digital image of a check can be used in a deposit transaction before approval of the deposit transaction, the stored instructions executable by a computing device including a processor and memory, comprising:

(i) instructions for receiving a digital image of a physical check from a financial institution server;

(ii) instructions for initiating an image validation process to determine whether said digital image of the physical check meets an image requirement;

(iii) instructions for sending an approval to said financial institution server when said digital image of the physical check meets said image requirement;

(iv) instructions for repairing said digital image of said physical check by resolving an error with respect to said digital image when said digital image does not meet said image requirement; and (v) instructions for executing (i) through (iv) during a first time interval, wherein said first time interval is contained within a second time interval, said second time interval corresponding to an online customer session comprising communications between said financial institution server and a customer computer.

16. The computer readable medium of claim 15, wherein said digital image of a check is in a Tag Image File Format (TIFF) format.

17. The computer readable medium of claim 15, wherein said digital image of said physical check is initially in a first format, and further comprising instructions for converting said digital image of said physical check into a second format, wherein image validation is performed on said second format of said digital image.

18. The computer readable medium of claim 17, wherein said first format comprises a Joint Photographic Experts Group (JPEG) format, and wherein said second format comprises a Tag Image File Format (TIFF) format.

19. The computer readable medium of claim 17, further comprising instructions for, during the first time interval:

converting said repaired digital image to said second format;

re-validating said repaired digital image in said second format; and sending an approval or an error to said financial institution server based on said re-validation.

20. The computer readable medium of claim 15, further comprising instructions for notifying said financial institution server of the error when repairing does not resolve the error.

21. The computer readable medium of claim 15, wherein said image requirement comprises one or more of a TIFF format requirement, a bitonal requirement, a pixel density requirement, a size requirement, an intact corner requirement, and a clarity requirement.

22. The method of claim 1, further comprising:

repairing said digital image at least a second time before approval of the deposit transaction during said first time interval to resolve the error or a second error.

23. The method of claim 5, further comprising:

sending said digital image and said repaired digital image to third party electronics for validation and re-validation.

24. The method of claim 23, further comprising:

calling a third party application programming interface with said digital image or repaired digital image to be validated, to send said digital image or repaired digital image to the third party electronics.

25. The system of claim 8, wherein the instructions to determine whether a repair of the digital image of said physical check causes the digital image to meet the image requirement further comprises instructions to:

provide said digital image to third party electronics, the third party electronics to initiate image validation and to determine whether a repair of the digital image of said physical check causes the digital image to meet the image requirement; and receive an approval from the third party electronics that the repair caused the digital image to meet the image requirement, or an error that was unresolved by the third party electronics.

26. The system of claim 25, wherein the processor further executes instructions to send the approval or the error received from the third party electronics to the financial institution server.

27. The system of claim 25, wherein the instructions to provide the digital image of the physical check to third party electronics further comprises instructions executed by the processor to call an application programming interface for a web-enabled application exposed by said third party electronics such that software executed by the third party electronics validates the digital image while the digital image resides in the memory.

28. The computer readable medium of claim 15, further comprising instructions for repairing said digital image at least a second time before approval of the deposit transaction during said first time interval to resolve the error or a second error.

29. The computer readable medium of claim 19, further comprising instructions for sending said digital image and said repaired digital image to third party electronics for validation and re-validation.

30. The computer readable medium of claim 29, further comprising instructions for calling a third party application programming interface with said digital image or repaired digital image to be validated, to send said digital image or repaired digital image to the third party electronics.

\* \* \* \* \*